US009751506B2

(12) United States Patent
Mudalige et al.

(10) Patent No.: US 9,751,506 B2
(45) Date of Patent: Sep. 5, 2017

(54) ALGORITHMS FOR AVOIDING AUTOMOTIVE CRASHES AT LEFT AND RIGHT TURN INTERSECTIONS

(71) Applicant: GM GLOBAL TECHNOLOGY OPERATIONS LLC, Detroit, MI (US)

(72) Inventors: Upali Priyantha Mudalige, Oakland Township, MI (US); Thanura Ranmal Elvitigala, Hershey, PA (US)

(73) Assignee: GM Global Technology Operations LLC, Detroit, MI (US)

(*) Notice: Subject to any disclaimer, the term of this patent is extended or adjusted under 35 U.S.C. 154(b) by 71 days.

(21) Appl. No.: 14/924,585

(22) Filed: Oct. 27, 2015

(65) Prior Publication Data

US 2017/0113665 A1    Apr. 27, 2017

(51) Int. Cl.
| | | |
|---|---|---|
| *G06F 17/10* | (2006.01) | |
| *G08G 1/16* | (2006.01) | |
| *B60T 7/22* | (2006.01) | |
| *G01S 13/93* | (2006.01) | |
| *G01S 17/93* | (2006.01) | |

(52) U.S. Cl.
CPC .............. *B60T 7/22* (2013.01); *G01S 13/931* (2013.01); *G01S 17/936* (2013.01); *G08G 1/166* (2013.01); *G01S 2013/9346* (2013.01)

(58) Field of Classification Search
CPC ............ G08G 1/07; G08G 1/16; G08G 1/161; B60W 30/095; B60W 30/00
USPC ............................................ 701/26, 117, 301
See application file for complete search history.

(56) References Cited

U.S. PATENT DOCUMENTS

| | | | | |
|---|---|---|---|---|
| 7,124,027 | B1* | 10/2006 | Ernst, Jr. .............. | B60W 30/09 340/435 |
| 9,177,477 | B2* | 11/2015 | Mochizuki ............ | G08G 1/161 |
| 2010/0305858 | A1* | 12/2010 | Richardson ........ | G06K 9/00785 701/301 |
| 2011/0298603 | A1* | 12/2011 | King ..................... | G08G 1/164 340/436 |

(Continued)

OTHER PUBLICATIONS

Misener, Jim et al. "Cooperative Intersection Collision Avoidance System (CICAS): Signalized Left Turn Assist and Traffic Signal Adaptation" California Path Research Report, Apr. 2010, 252 pages.

*Primary Examiner* — Thomas G Black
*Assistant Examiner* — Wae Louie
(74) *Attorney, Agent, or Firm* — John A. Miller; Miller IP Group, PLC

(57) ABSTRACT

A system and method for warning a driver of a host vehicle of a potential collision with other vehicles when turning at an intersection. The method includes determining if the host vehicle is likely to turn at the intersection, and if so, segmenting the intersection into a plurality of different regions, where each region has a different level of collision threat risk. The method obtains the speed, velocity and position of the host vehicle and any relevant remote vehicles in the intersection. The method determines a predicted path of the host vehicle and the predicted path of the remote vehicles. The method then determines whether the host vehicle and the remote vehicles will simultaneously occupy a collision zone in the intersection based on the predicted paths, and if so, issues a warning to the driver of the collision risk or apply vehicle controls to avoid or mitigate the collision risk.

27 Claims, 13 Drawing Sheets

(56) References Cited

U.S. PATENT DOCUMENTS

| | | | |
|---|---|---|---|
| 2013/0194127 A1* | 8/2013 | Ishihara | G01S 13/18 342/70 |
| 2014/0032089 A1* | 1/2014 | Aoude | G08G 1/00 701/117 |
| 2014/0267734 A1* | 9/2014 | Hart, Jr. | G06K 9/00785 348/149 |
| 2014/0372016 A1* | 12/2014 | Buchholz | G08G 1/161 701/117 |
| 2015/0314780 A1* | 11/2015 | Stenneth | B60W 30/00 701/23 |
| 2015/0344030 A1* | 12/2015 | Damerow | B60W 30/0956 701/1 |
| 2016/0368492 A1* | 12/2016 | Al-Stouhi | B60W 30/18154 |
| 2017/0032402 A1* | 2/2017 | Patsiokas | G06Q 30/0266 |

* cited by examiner

ALGORITHMS FOR AVOIDING AUTOMOTIVE CRASHES AT LEFT AND RIGHT TURN INTERSECTIONS

BACKGROUND OF THE INVENTION

Field of the Invention

This invention relates generally to a system and method for warning a vehicle driver of a host vehicle of a possible collision with another vehicle when turning left or right at an intersection and, more particularly, to a system and method for warning a vehicle driver of a host vehicle of a possible collision with another vehicle when turning left or right turn at an intersection that includes segmenting the intersection into different regions, such as an approach region, a waiting region and a non-waiting region in the intersection, and providing automatic braking control to prevent a collision, if necessary.

Discussion of the Related Art

Object detection systems and collision avoidance systems are becoming increasingly common on modern vehicles. Object detection systems can provide a warning to a driver about an object in the path of a moving host vehicle. The warning can be a visual indication on the vehicles instrument panel or in a head-up display (HUD), and/or can be an audio warning such as chimes or other feedback device, such as haptic seat. Object detection systems can also provide input to active vehicle systems, such as adaptive cruise control systems, which control vehicle speed to maintain the appropriate longitudinal spacing to a leading vehicle, and rear cross traffic avoidance systems, which can provide both warnings and automatic braking to avoid a collision with an object behind the host vehicle when the host vehicle is backing up.

Active safety technology employing object detection systems is currently becoming a major area of research in the automotive industry. Advances in sensor and actuator technologies have enabled the development of driver assistance systems (DAS) to prevent road accidents, especially those caused by driver mistakes or inattention. Several types of DAS, such as anti-lock braking system (ABS), electronic stability control (ESC), adaptive cruise control (ACC), lane departure warning (LDW) system, lane change assist (LCA), forward collision alert (FCA), and lane keeping assist (LKA), are already in production vehicles. Collision imminent braking is an effective way of avoiding or mitigating a collision by applying the vehicle brakes. Collision avoidance systems may also provide steering commands that cause the host vehicle to follow a calculated steering path to provide the vehicle steering to avoid a collision when braking alone can only mitigate the collision.

The object detection sensors for these types of systems may use any of a number of technologies, such as short range radar, long range radar, cameras with image processing, laser or Lidar, ultrasound, etc. The object detection sensors detect vehicles and other objects in the path of a host vehicle. In many vehicles, the object detection sensors are integrated directly into the front bumper or other fascia of the vehicle, but other mounting locations are available.

Radar and lidar sensors that may be employed on vehicles to detect objects around the vehicle and provide a range to and orientation of those objects provide reflections from the objects as multiple scan points that combine as a point cloud (cluster) range map, where a separate scan point is typically provided for every ½° across the horizontal field-of-view of the sensor. These scan points also provide a reflectivity measure of the target surface in the form of intensity in addition to the range and azimuth angle values, and therefore, if a target vehicle or other object is detected in front of the host vehicle, there may be multiple scan points that are returned that identify the surface reflectivity, distance and azimuth angle of the target vehicle from the subject vehicle. By providing a cluster of scan return points, objects having various and arbitrary shapes, such as trucks, trailers, bicycle, pedestrian, guard rail, K-barrier, etc., can be more readily detected, where the bigger and/or closer the object to the host vehicle the more scan points are provided.

Cameras on a vehicle may provide back-up assistance, take images of the vehicle driver to determine driver drowsiness or attentiveness, provide images of the road as the vehicle is traveling for collision avoidance purposes, provide structure recognition, such as roadway signs, etc. Other vehicle vision applications include vehicle lane sensing systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers.

It is also known in the art to provide a surround-view camera system on a vehicle that includes a front camera, a rear camera and left and right side cameras, where the camera system generates a top-down view of the vehicle and surrounding areas using the images from the cameras, and where the images overlap each other at the corners of the vehicle. The top-down view can be displayed for the vehicle driver to see what is surrounding the vehicle for back-up, parking, etc. Future vehicles may not employ rearview mirrors, but may instead include digital images provided by the surround view cameras.

Various vehicle systems of the type being discussed herein require that the position and orientation of the vehicle be known. Currently, modern vehicles typically rely on a global navigation satellite system (GNSS), such as GPS, that provides signals to a vehicle display to identify vehicle location.

Vehicle-to-vehicle (V2V) and vehicle-to-infrastructure (V2I) communications systems, sometimes referred generally as V2X systems, are known to those skilled in the art, and require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the particular application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

When roadways cross intersections are created. In order to prevent vehicles from colliding with each other at an intersection, some type of traffic control mechanism, such as stop signs, yield signs, traffic lights, etc., are generally provided so that perpendicularly or cross-traveling traffic can travel safely through the intersection. However, intersections, especially high traffic intersections, are still the cause of many vehicle collisions and traffic accidents.

Known object detection sensor systems that attempt to warn the driver of potential collisions while making a left or right turn at an intersection typically rely on a single algorithm for providing the warning regardless of where the host vehicle is relative to the intersection and at what speed and direction the host vehicle is traveling. Typically these types of algorithms are ineffective because they are unable to consistently warn the driver in time before the collision occurs. More particularly, different vehicles are operated at different speeds and aggressiveness, where some vehicles approach an intersection very quickly while others approach the intersection more slowly, and where the host vehicle may stop in the intersection to allow opposing traffic to pass before making the turn. Because of these variations such algorithms are ineffective in providing a warning in a suitable amount of time, and thus, improvements need to be made before they can be provided on commercial vehicles.

SUMMARY OF THE INVENTION

The present disclosure describes a system and method for warning a driver of a host vehicle of a potential collision with other vehicles when turning left or right at an intersection, where the system and method may provide automatic braking if a collision is imminent. The method includes determining if the host vehicle is likely to turn at the intersection with a predetermined level of confidence, and if so, segmenting the intersection and surrounding area into a plurality of different regions, where each region has a different level of collision threat risk. The regions can be determined differently for different intersection types, and can include an approach region before the intersection that the host vehicle will travel through, a waiting region in the intersection that the host vehicle will travel through when making the turn, and a no-waiting region in the intersection that the host vehicle will travel through when making the turn. The method obtains the speed, velocity and position of the host vehicle and any relevant remote vehicles or other objects in or near the intersection. The method determines a predicted path of the host vehicle as the host vehicle travels through the intersection for each of the different segmented regions and the predicted path of the remote vehicles. The method then determines whether the host vehicle and the remote vehicles will simultaneously occupy a collision zone in the intersection based on the predicted paths, speeds and accelerations, and if so, issues a warning to the driver of the host vehicle of the collision risk.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for assessing a collision threat at an intersection when a host vehicle is turning left or right and providing a warning to a driver of the host vehicle of a potential collision is merely exemplary in nature, and is in no way intended to limit the invention or its applications or uses.

As will be discussed in detail below, the present invention proposes collision assessment algorithms that provide information to a driver of a host vehicle, a warning to the driver, and/or automatic braking and/or steering control, if necessary, when a vehicle is turning right or left at an intersection for a confidence level of driver turning intent based on a determined collision threat with other vehicles traveling in and through the intersection. The determination of whether to give the information, warning and/or automatic braking includes separating the area in which the vehicle may travel in the intersection when it turns into separate regions, namely, an approach region before the intersection, a waiting region inside the intersection and a no-waiting region inside the intersection, which are different areas in the intersection depending on whether the vehicle is turning right or turning left, where a separate algorithm for collision threat assessment is employed for each region to identify the collision threats. The algorithms identify the various remote vehicles that may be entering the intersection, that are in the intersection, that are turning at the intersection, etc., analyze the speed and location of those vehicles relative to the speed and location of the host vehicle, and identify the collision threat potential for the approach region, the waiting region and the no-waiting region. The algorithms can use any information that is available to identify necessary parameters, such as a map database, V2X communications, object detection sensors on the vehicle, cameras on the vehicle, etc., where the specific location of the intersection and the host vehicle may not need to be overly accurate.

It is noted that the discussion herein is specific to vehicle travel direction on the right, where a vehicle making a left turn will cross lanes for oncoming traffic. However, it is stressed that the algorithms and discussion herein equally apply to those countries and roadways where vehicles travel on the left and would cross in front of oncoming traffic when making a right turn. It is also noted that, as will be understood by those skilled in the art, the algorithm parameters described here can be adjusted to suit different driver-selectable configurations, such as aggressive, normal, conservative, etc., to modify the warning/output timing provided by the particular feature. Alternatively, the system can itself adjust these parameters based on the driving style of the driver.

Figure 1:
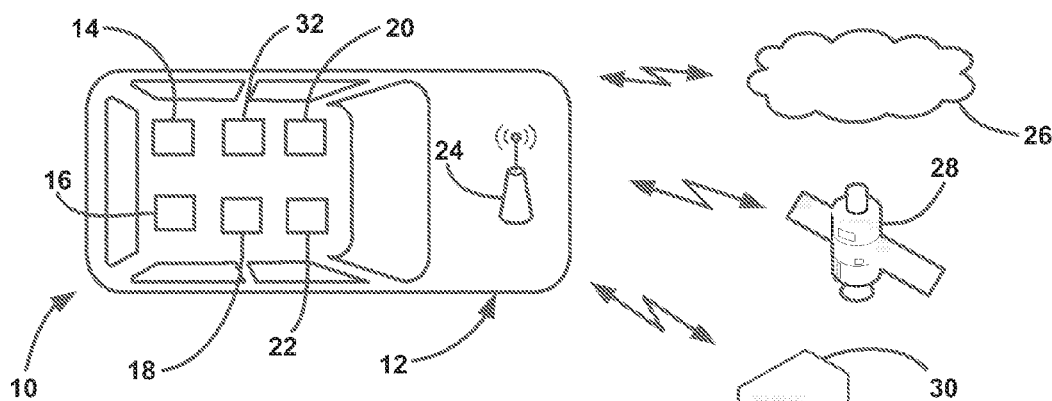
FIG. 1 is an illustration of a vehicle including various components for identifying operation of the vehicle and detecting objects around the vehicle.

FIG. 1 is a simple illustration of a vehicle system 10 that includes a vehicle 12 having a map database 14, a navigation system 16, an operation controller 18, a warning device 20, sensors/detectors 32 and a vehicle controller 22. The controller 18 is intended to represent all of the separate modules, controllers, processors, electronic control units, etc. that are necessary to perform and run the various algorithms and processes discussed herein. The map database 14 stores map information at any level of detail that is available, including specific information about intersections, such as the number of lanes, the lane travel patterns, etc. The map database 14 operates in association with the navigation system 16 to display the various maps and other information that is available, and allow a user to input, plan and display a route. The sensors/detectors 32 are intended to represent any and all object detection sensors or cameras on the vehicle 12, such as forward, rear and side cameras, back-up cameras, lidar sensors, long range radar detectors, short range radar detectors, etc., located at any position on the vehicle 12. The warning device 20 can be any suitable warning device, such as display icons, haptic seat, chimes, etc. The controller 22 controls the operation of the vehicle 12, including steering, brake, throttle, etc., possibly for both autonomous and semi-autonomous capabilities, and provides any other vehicle control consistent with the discussion herein. The vehicle 12 also includes a wireless port 24 that allows the vehicle 12 to wirelessly transmit messages and receive messages from many sources, such as the Internet 26, a satellite 28, a wireless infrastructure 30, etc. The wireless port 24 also allows the vehicle 12 to provide V2I and V2V communications, if available.

Figure 2:
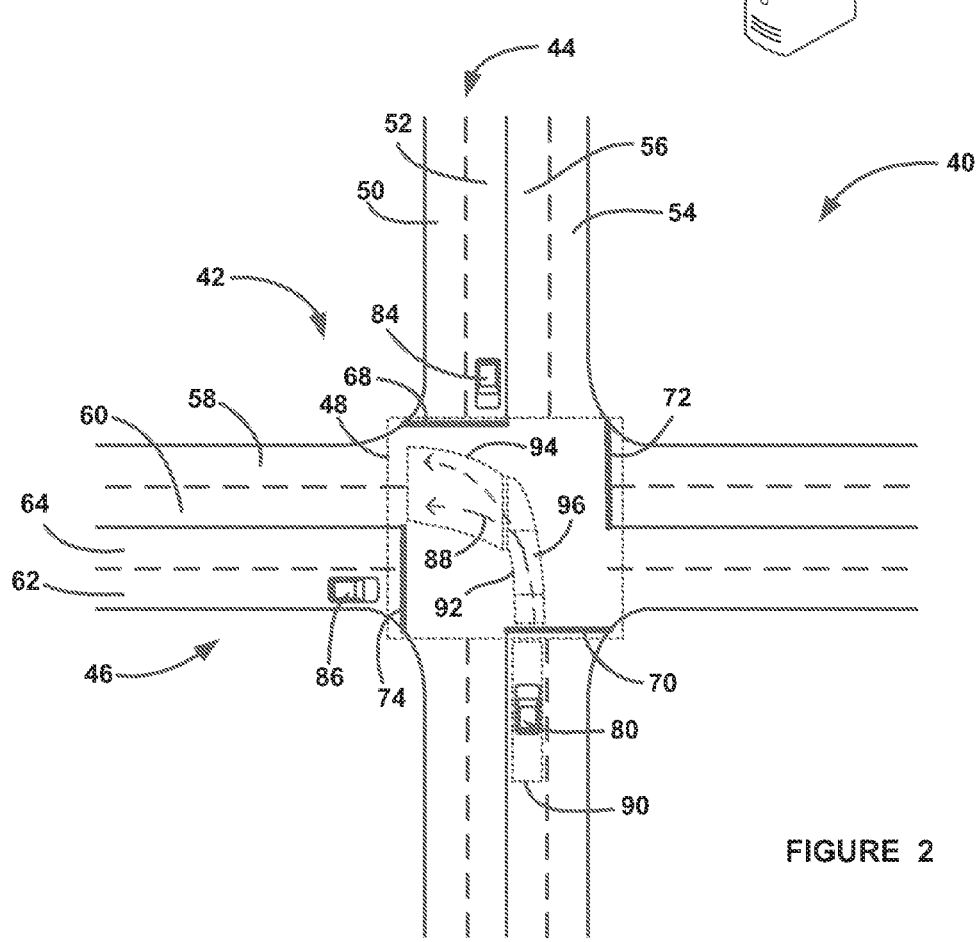
FIG. 2 is an illustration of an intersection showing a host vehicle making a left turn.

FIG. 2 is an illustration 40 of a roadway intersection 42, where roadways 44 and 46 cross defining an intersection region 48. The roadway 44 includes two travel lanes 50 and 52 for traffic flow in one direction and two travel lanes 54 and 56 for traffic flow in an opposite direction. Likewise, the roadway 46 includes two travel lanes 58 and 60 for traffic flow in one direction and two travel lanes 62 and 64 for traffic flow in an opposite direction. Stop bar 68 is a stop line location for the lanes 50 and 52 at the intersection 42, stop bar 70 is a stop line location for the lanes 54 and 56 at the intersection 42, stop bar 72 is a stop line location for the lanes 58 and 60 at the intersection 42, and stop bar 74 is a stop line location for the lanes 62 and 64 at the intersection 42. The travel lanes 50, 52, 54, 56, 58, 60, 62 and 64 can be any of straight through only, left turn only, right turn only or shared straight through, left turn and/or right turn.

The intersection 42 shows a host vehicle 80 traveling in the travel lane 56 that is approaching the intersection 42, and making a left turn into one of the travel lanes 58 or 60 along a predicted path 88, where further discussion of how the predicted path 88 is determined is provided below. An opposite direction remote vehicle 84 is shown traveling in the travel lane 52 and a lateral remote vehicle 86 is shown traveling in the travel lane 62. As will be discussed in detail below, the area inside and around the intersection region 48 is segmented into different regions based on the predicted path 88 and location of the host vehicle 80, the predicted path and locations of the remote vehicles 84 and 88, intersection geometry including number of travel lanes, etc. For example, the algorithms may identify an approach region, a waiting region and a no-waiting region in the intersection 42, and may further segment those regions into smaller regions depending on whether the host vehicle 80 is intending to make a right or left turn, the size of the intersection 42, the location and speed of other vehicles and objects in the intersection 42, etc.

In the illustration 40, the host vehicle 80 is shown in an approach region 90 before the intersection region 48. When the host vehicle 80 makes the left turn, it will enter the intersection region 48, and then enter a waiting region 92, where the vehicle 80 may wait to make the left turn when opposing traffic is present. The determination of whether the vehicle 80 is going to stop in the waiting region 92 is based on, for example, the road wheel angle and/or the yaw rate of the vehicle 80 and/or whether the driver is applying the brakes of the host vehicle 80, where the vehicle 80 is decelerating. A no-waiting region 94 is also defined in the intersection region 48 and is in the pathway of oncoming traffic, such as the remote vehicle 84, where the host vehicle 80 is not allowed to stop. Since the vehicle 80 may be waiting in the waiting region 92 for oncoming traffic to clear, but may be creeping along in the waiting region 92 as it moves closer to the no-waiting region 94, the waiting region 92 is separated into zones 96 as the vehicle 80 may slightly move along in the waiting region 92 to predict the collision threat more accurately.

In order to determine when the host vehicle 80 is entering the regions 92 and 94, it is necessary to predict the path 88 of the host vehicle 80 while it is making the turn. Many algorithms exist in the art for predicting the path of a vehicle, and typically use the vehicle yaw rate and/or road wheel angle to define that path, which are generally not very accurate because the yaw rate may not be as sharp as the required turning radius to make the turn. Thus, when the host vehicle 80 is making a turn at the intersection 42, the turning radius of the host vehicle 80 may not exactly match the angle necessary to enter the lane 58 or 60, and thus the present invention determines the predicted path 88 of the vehicle 80 based not only on vehicle position and dynamics, but also on the geometry of the intersection 42. In one embodiment, the algorithm obtains the predicted path 88 of the host vehicle 80 using vehicle yaw rate and/or road wheel angle, and then refines that predicted path based on the geometry of the intersection 42 depending on whether that information is available, and specifically the locations of the lanes 58 and 60.

Figure 3:
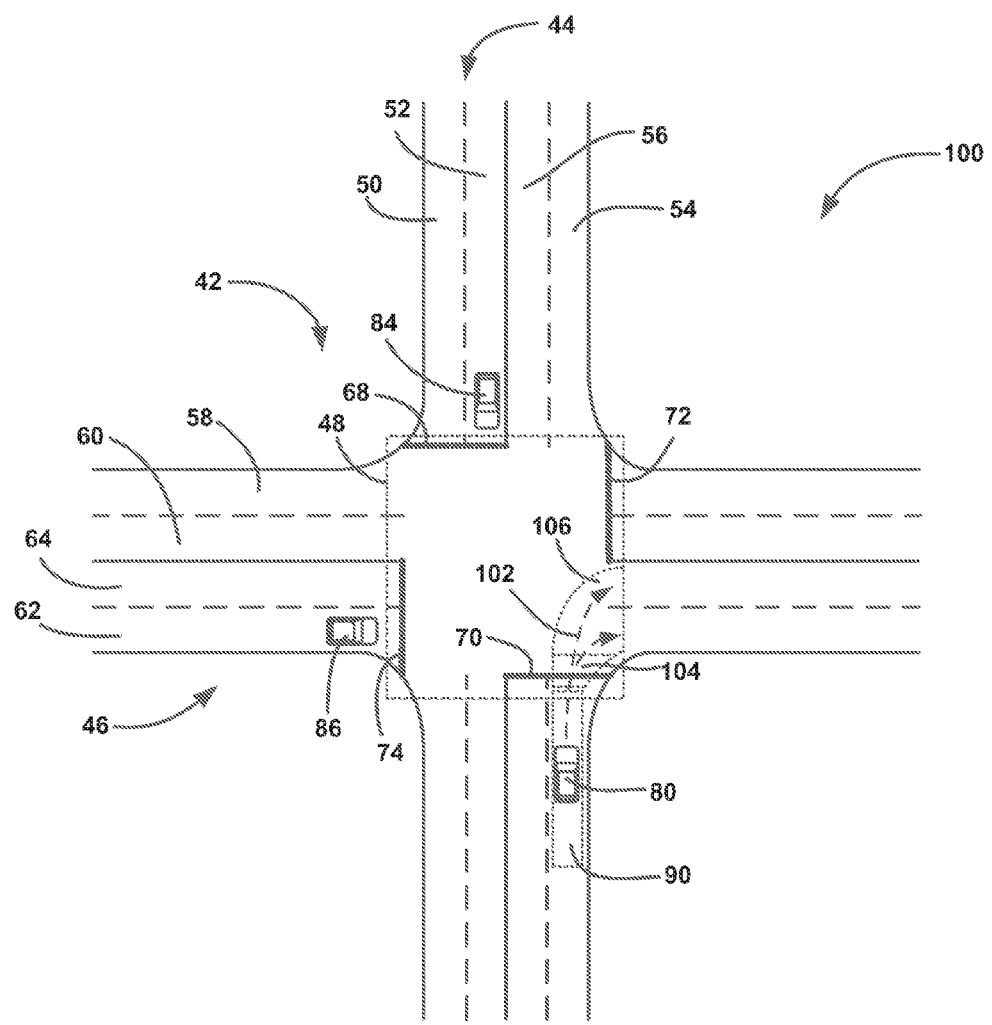
FIG. 3 is an illustration of an intersection showing a host vehicle making a right turn.

FIG. 3 is an illustration 100 of the intersection 42 similar to the illustration 40, where like elements are identified by the same reference number, showing the host vehicle 80 in the approach region 90 before the intersection 42 and intending to make a right turn into the lane 62 or 64 along predicted path 102. As with the left turning scenario discussed above, a waiting region 104 where the host vehicle 80 can stop and wait in the intersection region 48 and a no-waiting region 106 where the host vehicle 80 cannot stop in the intersection region 48 because of collision threats coming from the lateral direction by, for example, the lateral remote vehicle 86 are identified.

Based on the illustrations 40 and 100 shown in FIGS. 2 and 3, the present invention identifies when to provide possible collision threat information to the driver, provide a warning to the driver of a possible collision, and/or provide automatic braking in response to a detected collision threat. As mentioned above, the intersection 42 is separated into various regions and zones depending on intersection geometry and vehicle speed and location, and different algorithms may be employed to identify the collision threats based on this available information.

Figure 4:
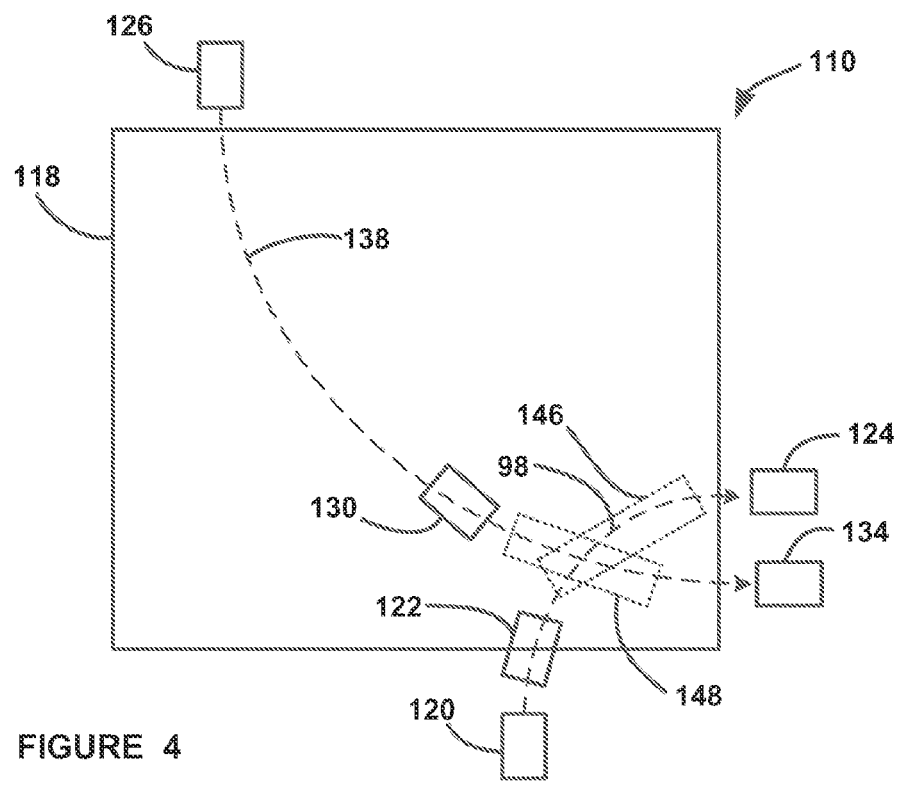
FIG. 4 is an illustration of an intersection showing the position of a host vehicle making a right turn and an opposite direction remote vehicle making a left turn at different periods in time.
Figure 5:
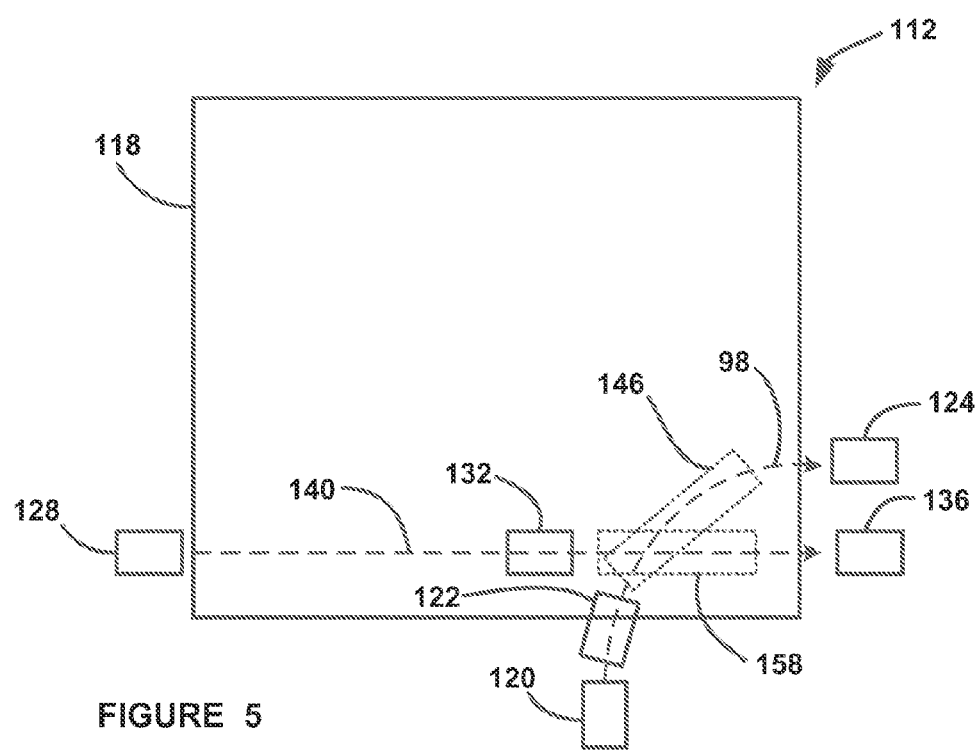
FIG. 5 is an illustration of an intersection showing the position of a host vehicle making a right turn and a lateral remote vehicle traveling straight through the intersection at different periods in time.
Figure 6:
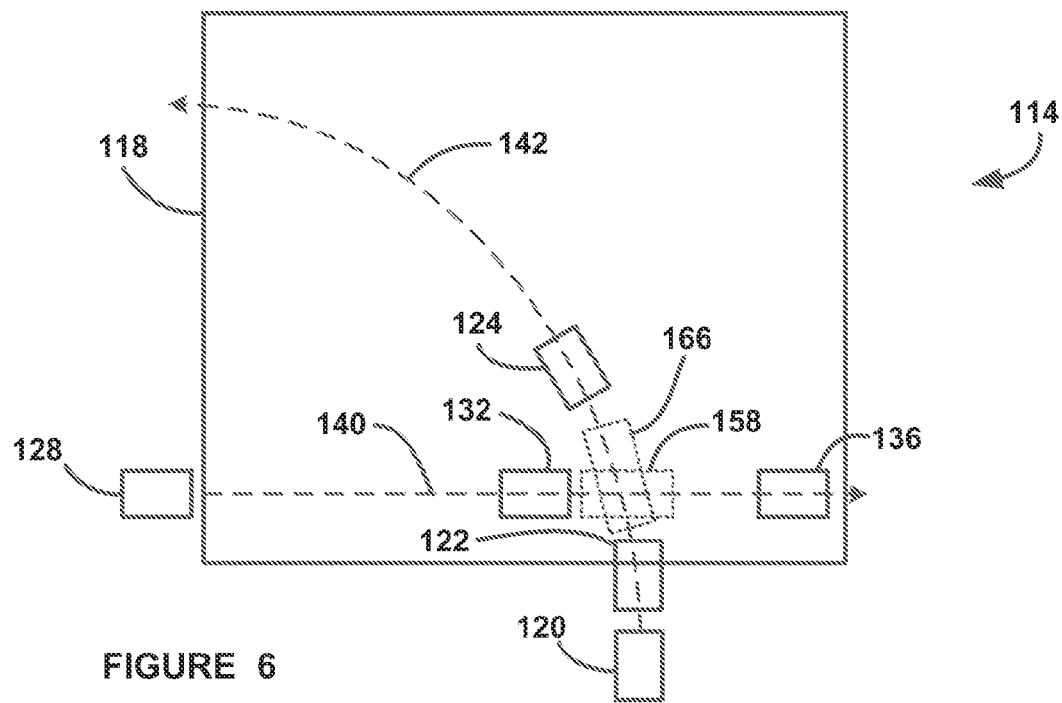
FIG. 6 is an illustration of an intersection showing the position of a host vehicle making a left turn and a lateral remote vehicle traveling straight through the intersection at different periods in time.
Figure 7:
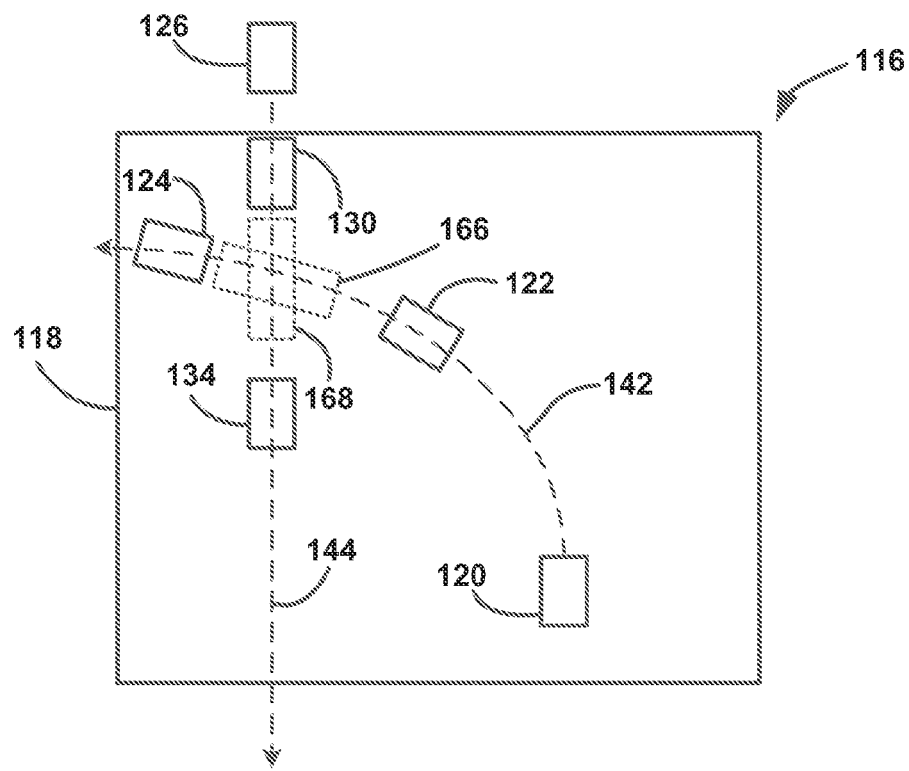
FIG. 7 is an illustration of an intersection showing the position of a host vehicle making a left turn and an opposite direction remote vehicle traveling straight through the intersection at different periods in time.

FIGS. 4, 5, 6 and 7 show four exemplary situations of possible collision threats from the opposite direction remote vehicle 84 and the lateral direction remote vehicle 86, where box 118 represents a portion of the intersection region 48 and is referred to herein as a collision assessment region. Particularly, FIG. 4 is an illustration 110 showing a collision threat from the opposite direction remote vehicle 84 when the host vehicle 80 is turning right along path 98 and the remote vehicle 84 is turning left along path 138 in the assessment region 118; FIG. 5 is an illustration 112 showing a collision threat from the lateral remote vehicle 86 when the host vehicle 80 is turning right along the path 98 and the remote vehicle 86 is traveling straight along path 140 though the assessment region 118; FIG. 6 is an illustration 114 showing a collision threat from the lateral remote vehicle 86 when the host vehicle 80 is turning left along path 142 and the lateral remote vehicle 86 is travelling straight along the path 140 through the assessment region 118; and FIG. 7 is an illustration 116 showing a collision threat from the opposite direction remote vehicle 84 when the host vehicle 80 is turning left along the path 142 and the remote vehicle 84 is travelling straight along path 144 through the assessment region 118. It is noted that for the illustration 116 in FIG. 7, in this scenario, the host vehicle 80 does not stop and wait in the intersection region 48 for oncoming traffic to clear.

The collision assessment algorithms assess the threats of a collision in the assessment region 118 by analyzing the expected position and predicted path of the host vehicle 80, the expected position and predicted path of the opposite direction remote vehicle 84, and the expected position and predicted path of the lateral direction remote vehicle 86, which are determined by sensor information and dynamics of the velocity, acceleration and predicted path of the host vehicle 80 and the remote vehicles 84 and 86. In the illustrations 110, 112, 114 and 116, given the current location, predicted path and speed of the host vehicle 80, and the current location, predicted path and speed of the remote vehicles 84 and/or 86, a collision zone 146 is defined that is the area where the host vehicle 80 could collide with the remote vehicle 84 or 86 when the host vehicle 80 is turning right in the assessment region 118, a collision zone 148 is defined that is the area where the other direction remote vehicle 84 could collide with the host vehicle 80 when the remote vehicle 84 is turning left in the assessment region 118, a collision zone 158 is defined that is the area where the lateral direction remote vehicle 86 could collide with the host vehicle 80 when the remote vehicle 86 is traveling straight through the assessment region 118, a collision zone 166 is defined that is the area where the host vehicle 80 could collide with the remote vehicle 84 or 86 when the host vehicle 80 is turning left in the assessment region 118, and a collision zone 168 is defined that is the area where the other direction remote vehicle 84 could collide with the host vehicle 80 when the remote vehicle 84 is traveling straight through the assessment region 118 and the host vehicle 80 is turning left in the assessment region 118.

In each of the illustrations 110, 112, 114 and 116, box 120 represents the position of the host vehicle 80 at time $T=T_0$, where $T_0$ is the current time, box 122 represents the position of the host vehicle 80 when it is about to enter the collision zone 146 or 166 at time $T=T_1$, box 124 represents the position of the host vehicle 80 just after it has left the collision zone 146 or 166 at time $T=T_2$, box 126 represents the position of the opposite direction remote vehicle 84 at time $T=T_0$, box 128 represents the position of the lateral direction remote vehicle 86 at time $T=T_0$, box 130 represents the position of the opposite direction remote vehicle 84 when it is about to enter the collision zone 148 or 168 at time $T=T_3$, box 132 represents the position of the lateral direction remote vehicle 86 when it is about to enter the collision zone 158 at time $T=T_3$, box 134 represents the position of the opposite direction remote vehicle 84 just after it has left the collision zone 148 or 168 at time $T=T_4$, and box 136 represents the position of the lateral direction remote vehicle 86 when it has just left the collision zone 158 at time $T=T_4$. It is noted that as shown by the illustrations 110, 112, 114 and 116, the collision threat assessment algorithms assess the collision risk from the lateral remote vehicle 86 before the host vehicle 80 enters the assessment region 118 regardless of whether the host vehicle 80 is turning right or left, assess the collision risk from the opposite direction remote vehicle 86 before the host vehicle enters the assessment region 118 if the host vehicle is turning right, and assess the collision risk from the opposite direction remote vehicle 86 after the host vehicle 80 enters the assessment region 118 when the host vehicle 80 is turning left.

Figure 8:
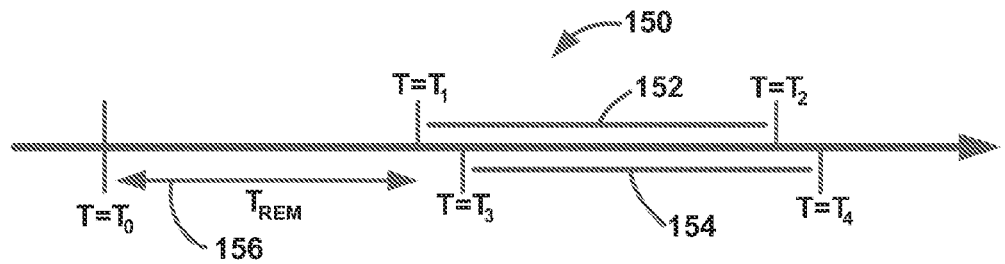
FIG. 8 is a time line showing the times illustrated in FIGS. 4-7.

FIG. 8 is a time line 150 that applies to all of the illustrations 110, 112, 114 and 116 in FIGS. 4-7 showing each of the times $T_0$, $T_1$, $T_2$, $T_3$ and $T_4$. When analyzing the threat assessments for the above described and other scenarios, the collision assessment algorithms calculate the duration that the host vehicle 80 is expected to occupy the collision zone 146 or 166 from time $T_1$ to time $T_2$, represented by line 152 in the time line 150. The algorithm also calculates the duration that the opposite direction remote vehicle 84 and/or the lateral remote vehicle 86 is expected to occupy the collision zones 158 or 166 from time $T_3$ to time $T_4$, represented by line 154 in the time line 150. If there is an overlap in the times represented by the lines 152 and 154, then the algorithm also identifies a time remaining $T_{REM}$ that is the time it will take the host vehicle 80 to enter the collision zone 146 or 166 represented by line 156 in the time line 150. The algorithm will provide collision threat information, issue a warning, and/or provide automatic braking when $T_{REM} < T_{THR}$, where the time threshold $T_{THR}$ for a warning is determined experimentally considering driver reaction time and system delays, and the time threshold $T_{THR}$ for automatic braking is determined by considering system delays. In one non-limiting example, if $T_{REM}$ is greater than ten seconds, then no action is performed, if $T_{REM}$ is between four and ten seconds, then potential collision information is provided to the vehicle driver, such as an icon being provided on the display, if $T_{REM}$ falls below four seconds, then the algorithm provides a warning, such as a chime or haptic seat, and if $T_{REM}$ indicates an immediate collision threat, then the algorithm may provide automatic braking and/or steering.

The discussion above for the illustration 116 when the host vehicle 80 is turning left will likely not provide the desirable results if the host vehicle 80 stops in the waiting region 92 to wait for opposite direction traffic to clear because of delays in receiving updated velocity and acceleration values for the host vehicle 80, and time to collision (TTC) values based algorithms may not be sufficient to provide warnings to the driver before entering the no-waiting region 94. In other words, the time $T_{REM}$ is too short to provide accurate results.

Figure 9:
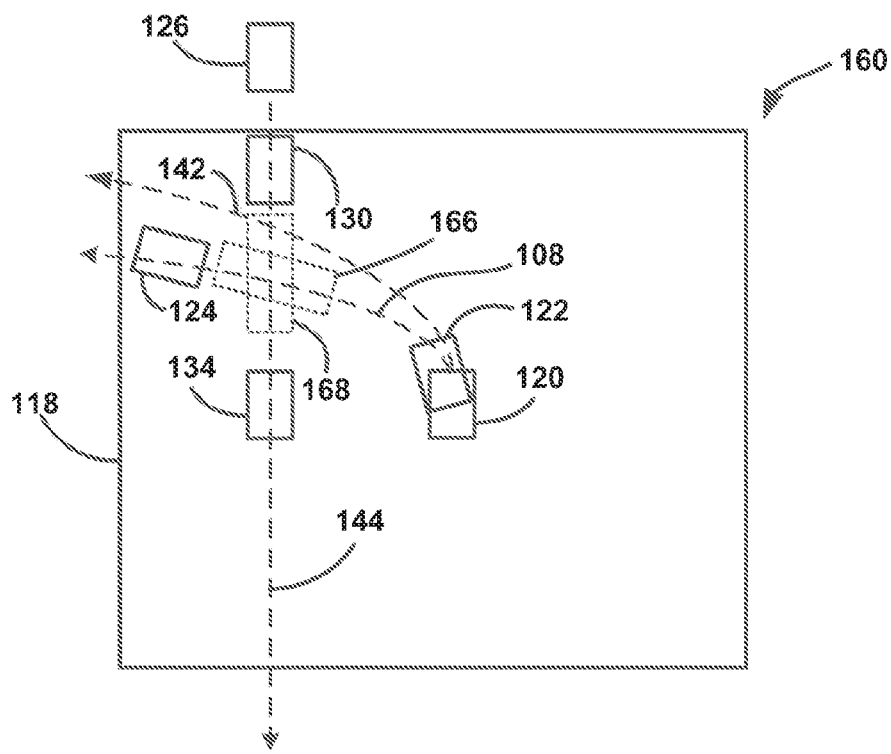
FIG. 9 is an illustration of an intersection showing a host vehicle waiting in the intersection and then making a left turn and an opposite direction remote vehicle traveling straight through the intersection at different periods in time.
Figure 10:
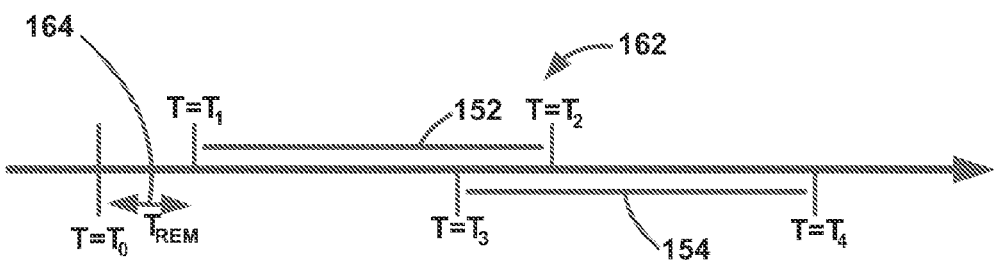
FIG. 10 is a time line showing the times illustrated in FIG. 9.

FIG. 9 is an illustration 160 showing this scenario and FIG. 10 is a timeline 162 for the illustration 160, where like elements to the illustration 116 and the time line 150 are shown by the same reference numbers. In the illustration 160, the host vehicle 80 is at time $T=T_0$ when it is in the waiting region 92 and is stopped or creeping along waiting for the traffic to clear. In this scenario, the time $T_1$ when the host vehicle 80 may enter the collision zone 166 may be small as shown by time line 164, which represents time $T_{REM}$, and the algorithm will not allow a warning to be given because of uncertainty. The predicted path 142 of the host vehicle 80 is based on the vehicle's current yaw rate and/or road wheel angle, but is probably not a likely path 108 of the host vehicle 80 if it is making the left turn because the vehicle 80 will be angled straighter relative to its travel lane to better allow the driver to watch for oncoming traffic. Thus, the algorithm will not inform the driver or provide a warning based on these parameters.

In this embodiment, the algorithm instead detects the start of the left turn of the host vehicle 80 by the release of the vehicle brakes, considers the closeness between the predicted path 142 based on road wheel angle and the likely path 108 of the host vehicle 80 during the left turn, and the time $T_3-T_0$ that identifies when the remote vehicle 84 will enter the collision zone 168. If the host vehicle 80 is in the waiting region 92 and is creeping, when the yaw angle changes and/or the road wheel changes indicating a turn, the algorithm can determine that the host vehicle 80 is about to start the turn.

The correlation (closeness) between the predicted path 142 and the likely path 108 of the host vehicle 80 can be computed by a correlation coefficient $C_{PL}$, which is defined as:

$$C_{PL} = C_X \cdot C_Y, \quad (1)$$

where:

$$C_X = \frac{N \ast \Sigma X_{Pi} \ast X_{Li} - \Sigma X_{Pi} \ast \Sigma X_{Li}}{\sqrt{N \ast \Sigma(X_{Pi})^2 - (\Sigma X_{Pi})^2} \ast \sqrt{N \ast \Sigma(X_{Li})^2 - (\Sigma X_{Li})^2}}, \quad (2)$$

-continued $$C_Y = \frac{N \ast \Sigma Y_{Pi} \ast Y_{Li} - \Sigma Y_{Pi} \ast \Sigma Y}{\sqrt{N \ast \Sigma(Y_{Pi})^2 - (\Sigma Y_{Pi})^2} \ast \sqrt{N \ast \Sigma(Y_{Li})^2 - (\Sigma Y_{Li})^2}}, \quad (3)$$

and where $C_X$ and $C_Y$ represent the correlation between the predicted path 142 and the likely path 108 in the X and Y directions, and are calculated using the closeness between individual nodes N, where $(X_{Pi}, Y_{Pi})$ and $(X_{Li}, Y_{Li})$ correspond to (X,Y) coordinates of the nodes N on the predicted path 142 and the likely path 108, respectively.

The algorithm issues a warning and/or provides automatic braking if the host vehicle brakes are released, $C_{PL} > C_{THR}$, where $C_{THR}$ is a coefficient threshold that is determined experimentally, and $T_3-T_0 < T_{THR2}$, where $T_{THR2}$ is determined experimentally considering driver reaction time and system delays for issuing a warning, such as system delays for providing automatic braking. Using the correlation coefficient $C_{PL}$ is one way in which a determination of a warning should be issued, where determining road wheel angle can be another way. It is also noted that this analysis for a vehicle waiting in the waiting region 92 for traffic to clear equally applies to a vehicle waiting in the waiting region 104 for traffic to clear to make a right turn.

Figure 11:
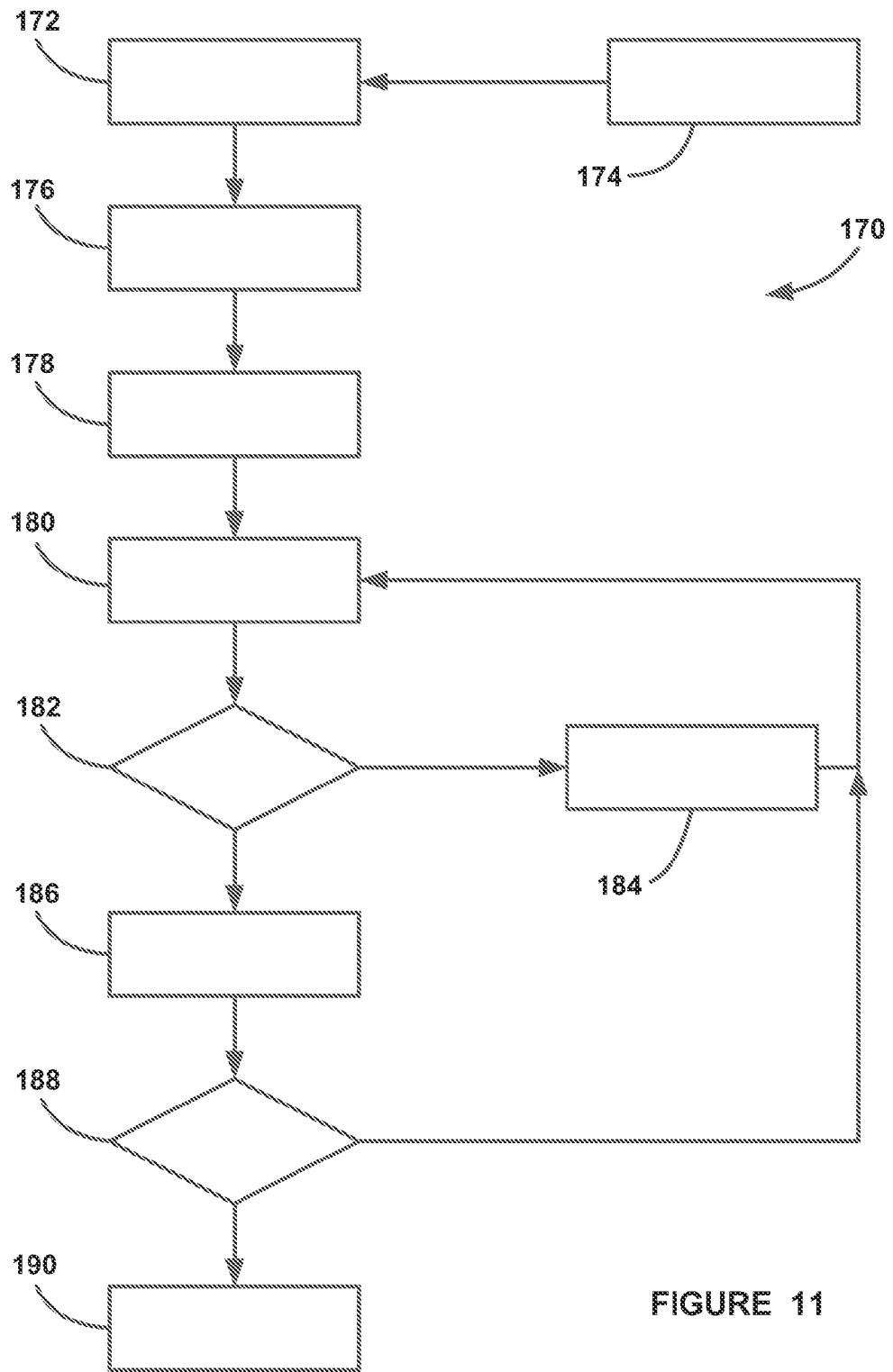
FIG. 11 is a flow chart diagram showing a process for assessing threats when a vehicle is making a left or right turn at an intersection.

FIG. 11 is a flow chart diagram 170 showing a process for assessing a collision threat when the host vehicle 80 is making a left turn or a right turn at the intersection 42. At box 172, the collision assessment algorithm determines whether the host vehicle 80 is arriving at the intersection 42 and the confidence level of whether the host vehicle 80 is about to make a left or right turn based on all of the information that is available to the algorithm as discussed herein, such as data available from onboard sensors on the vehicle 80, wireless data received from infrastructure, such as V2X, Onstar™, Internet Cloud, the travel lane that the vehicle 80 is in, the speed of the vehicle 80, turn signal activation, whether the vehicle 80 is slowing down, etc., all provided at box 174.

Once the algorithm makes the determination of a turn at a certain confidence level, the algorithm then determines where the host vehicle 80 will be located, and in particular the location of the host vehicle 80 in the intersection 42, based on the predicted path 88 or 102 of the vehicle 80 using the available information including intersection geometry at box 176. The algorithm then separates and segments the intersection 42 into the various regions, such as the waiting region 96 or 104 and the no-waiting region 94 or 106 based on the intersection geometry and vehicle state at box 178. The algorithm then assesses the collision threat level for the particular region in the intersection 42 that the host vehicle 80 is about to enter depending on which region it is in at box 180. The algorithm then determines whether entering the particular region based on all the information available to it is safe based on collision threats to the vehicle 80 at decision diamond 182. If entering the particular region is not safe at the decision diamond 182, then the algorithm will cause certain actions to be performed at box 184, such as providing a warning, automatic braking, etc., as discussed above, and then will return to the box 180 for assessing the collision threats. If the algorithm determines that it is safe for the host vehicle 80 to enter the particular region at the decision diamond 182, then algorithm allows the vehicle 80 to enter the region at box 186, and determines if the left turn across path or right turn (LTAP/RT) has been completed at decision diamond 188, and if not, returns to the box 180 to assess the collision threats. Otherwise, the algorithm ends at box 190.

Figure 12:
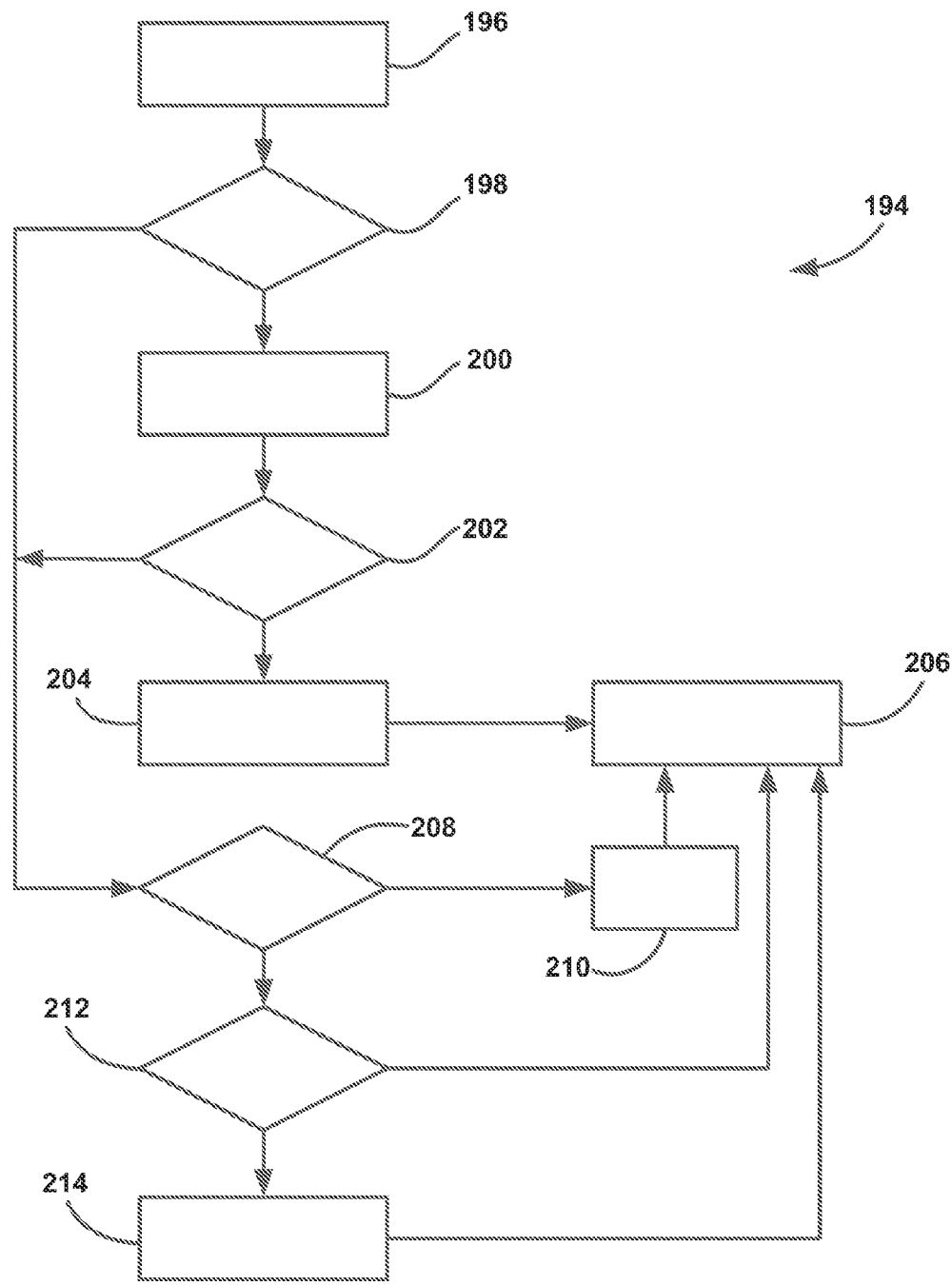
FIG. 12 is a flow chart diagram showing a process for deciding if it is safe for a vehicle to enter an intersection.

FIG. 12 is a flow chart diagram 194 showing a process for determining whether the host vehicle 80 can enter the intersection 42, where the collision assessment algorithm starts at box 196. It is noted that the algorithm associated with the flow diagram 194 is repeatedly performed until the host vehicle 80 enters the intersection 42. At decision diamond 198 the algorithm determines whether the vehicle 80 is allowed to enter the intersection 42, by, for example, determining whether there is a stop sign, determining whether a signal light is red, etc., using the available resources, such as camera data provided by cameras on the vehicle 80, lidar sensors, V2X communications from infrastructure including the signal light, etc. If the host vehicle 80 is allowed to enter the intersection 42 at the decision diamond 198, then the algorithm assesses the immediate collisions threats from other vehicles in the intersection 42 at box 200, such as threats coming from cross-traffic on the left side. It is noted that assessing the immediate collision threats from other vehicles from the left side is for those roadway and countries where vehicles travel on the right. If the system is being employed on vehicles in countries where travel is on the left, then the immediate threats will likely come from the right side. The algorithm then determines whether it is safe for the vehicle 80 to proceed into the intersection 42 at decision diamond 202, and if so, the vehicle 80 enters the intersection 42 and proceeds through the waiting region at box 204, where the algorithm ends at box 206.

If the vehicle 80 is not allowed to enter the intersection 42 at the decision diamond 198 or it is not safe to enter the intersection 42 at the decision diamond 202, then the algorithm determines whether the time that the vehicle 80 will take at the current driving conditions to a stop bar before the intersection 42 is less than the time it takes for the vehicle 80 to stop before the stop bar at decision diamond 208. In other words, the algorithm determines based on the driving behavior of the driver, the speed of the vehicle 80, the road surface conditions, etc., whether the driver is likely to stop the vehicle 80 at the stop bar before the intersection 42, and, if the time to the stop bar is less than the time to stop, the algorithm provides automatic braking to occur at box 210 and the algorithm ends at the box 206. If the algorithm determines that the vehicle driver is likely to stop before the stop bar at the decision diamond 208, then the algorithm determines whether the time to stop at the stop bar under the current vehicle driving conditions is less than the time that the vehicle 80 will take at the current driving conditions to stop at the stop bar plus some additional predetermined delta time at decision diamond 212 to determine whether the vehicle 80 is approaching the intersection to quickly, but the driver still will be able to stop the vehicle 80 at the stop bar. If the time to the stop bar is less than the time that it takes to stop plus the delta time at the decision diamond 212, meaning that the driver is approaching the intersection 42 to quickly, the algorithm will issue a warning a box 214, and the algorithm ends at the box 206. If the time to the stop bar is not less than the time to the stop bar plus the delta time at the decision diamond 212, then the algorithm takes no action and the algorithm ends at the box 206.

Figure 13:
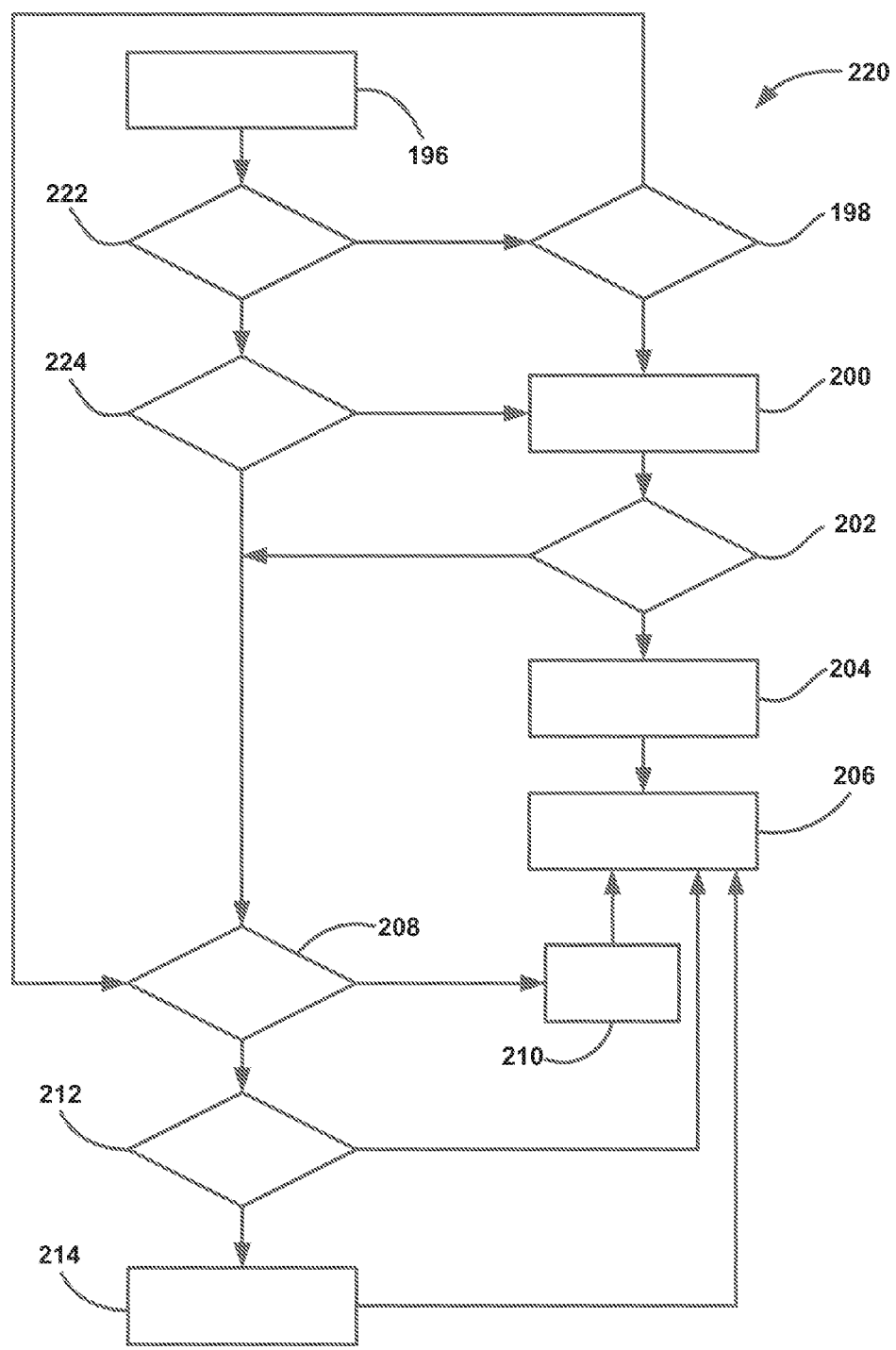
FIG. 13 is a flow chart diagram showing the process of FIG. 12 and employing V2I data.

The algorithm shown by the flow chart diagram 194 can be improved if there are V2I capabilities on the host vehicle 80. FIG. 13 is a flow chart diagram 220 showing such improvements, where like elements to the flow chart diagram 194 are identified by the same reference number. In this process, the algorithm determines whether signal space and timing (SPAT) data is available at decision diamond 222, and if not, proceeds to the decision diamond 198 to follow the same process as in the flow diagram 194. SPAT data wirelessly provides timing information that can be received by the host vehicle 80 that gives values as to how long the signal light will stay in its current position, such as in the green position. If the SPAT data is available at the decision diamond 222, the algorithm determines whether the time to a red light is greater than it takes for the vehicle 80 to cross the intersection 42 at decision diamond 224, and if it is, proceeds to the box 200 to assess collision threats. Because the V2I data is available and the timing of the signal lights is available to the algorithm, this information can be used to further assess potential collision threats by determining whether the vehicle 80 will still be in the intersection 42 when the signal light turns red. If the time to a red light is not greater than the time to the cross the intersection 42 at the decision diamond 224, then the algorithm proceeds to the decision diamond 208 to determine whether the current vehicle driving operation will allow the vehicle driver to stop at the stop bar.

Figure 14:
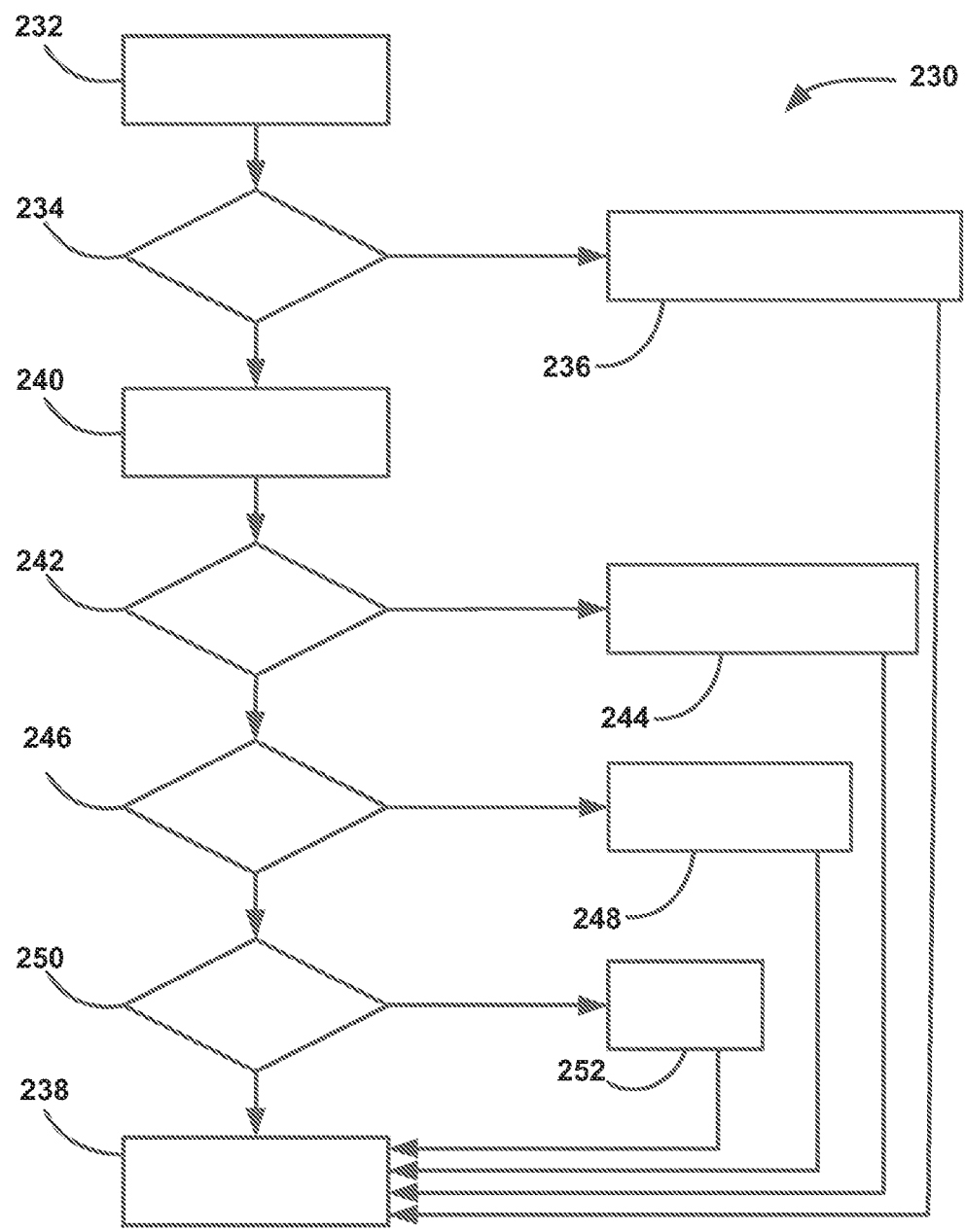
FIG. 14 is a flow chart diagram showing a process for determining whether it is safe to proceed through waiting-regions in an intersection.

FIG. 14 is a flow chart diagram 230 showing a process for determining decisions to proceed from the waiting region 92 or 104 to the no-waiting region 94 or 106 inside of the intersection 42, where the collision threat assessment is determined based on the specific location of the vehicle 80 while the host vehicle 80 is in the waiting region 92 or 104. In this scenario, for earlier zones in the waiting region 92 or 104, the threats may come from cross-traffic from the left, and for later zones in the waiting region 92 or 104, the threats may come from cross-traffic from the right.

The algorithm starts at box 232 and determines if the next region that the vehicle 80 will enter is the no-waiting region 94 or 106 at decision diamond 234. If the next region is the no-waiting region 94 or 106, then the algorithm performs conditioning at box 236 to enter the no-waiting region 94 or 106 and the algorithm ends at box 238. If the next region is not the no-waiting region 94 or 106 at the decision diamond 234, the algorithm assesses the relevant collision threats at box 240 as discussed herein and determines whether any threats are present at decision diamond 242. If there are no collision threats present at the decision diamond 242, the algorithm allows the vehicle 80 to proceed to the no-waiting region 94 or 106 at box 244 and the algorithm ends at the box 238. If there are collision threats detected at the decision diamond 242, the algorithm determines based on current vehicle and intersection conditions whether the time to the end of the region that the vehicle 80 is in is less than a time to stop to avoid the threat at decision diamond 246. If the time to the end of that region is less than the time to stop at the decision diamond 246, then the algorithm automatically applies the brakes and stops the vehicle 80 before the stop bar at box 248 and the algorithm each at the box 238. If the time to the end of that region is not less than the time to stop at the decision diamond 246, then the algorithm determines whether the time to the end of the region is less than the time to the stop bar plus some predetermined delta time at decision diamond 250, and if so, the algorithm issues a warning at the box 252 and the algorithm ends at the box 238.

Figure 15:
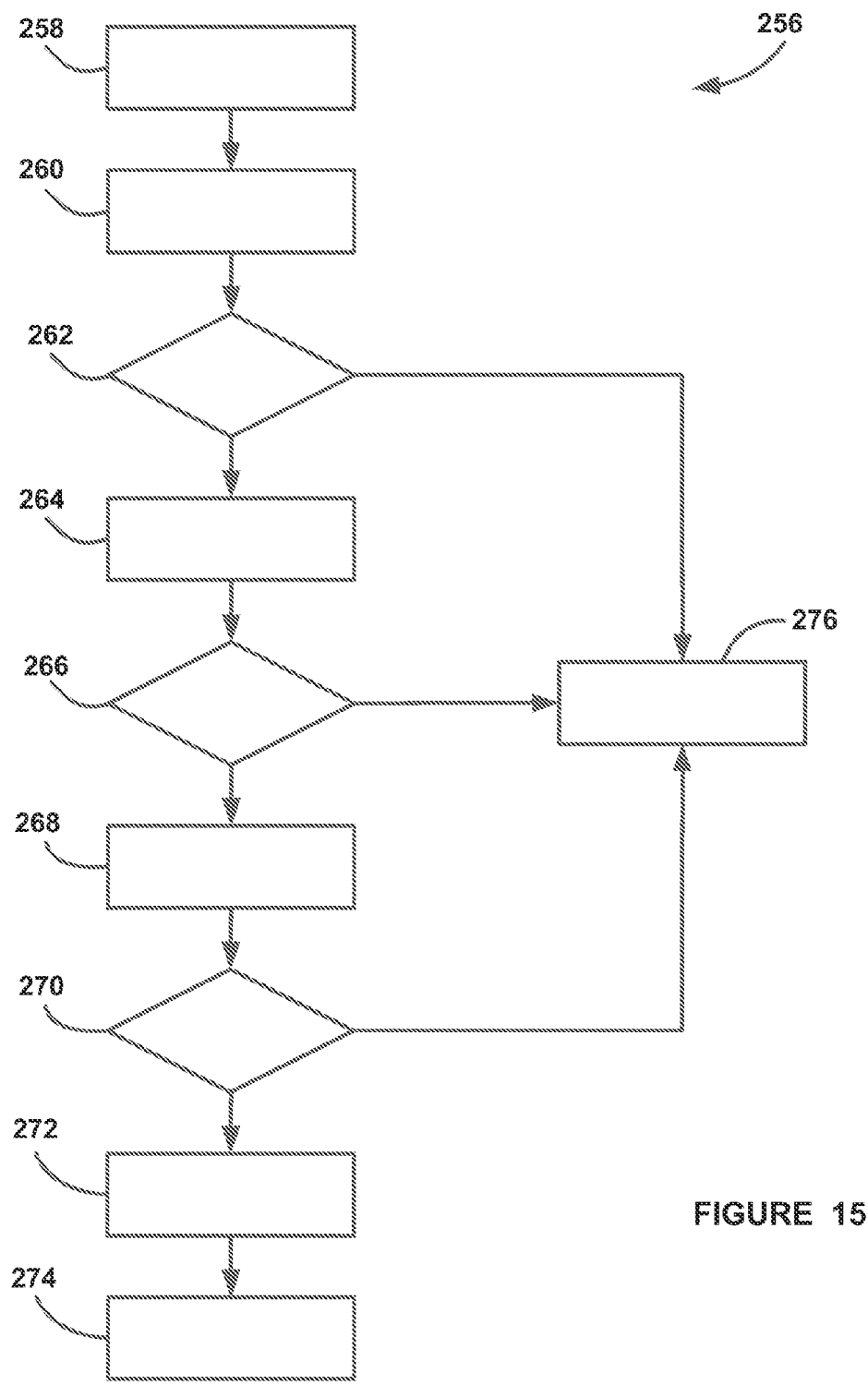
FIG. 15 is a flow chart diagram showing a process for determining whether to allow a vehicle to enter a no-waiting region in an intersection.

FIG. 15 is a flow chart diagram 256 of a portion of the collision assessment algorithm discussed herein that includes making decisions whether to enter the no-waiting region 94 or 106 inside the intersection 42. In this process, the collision threat assessment is conducted for threats from opposite vehicle traffic and pedestrians to decide whether a driver warning or automatic braking control should be performed. The algorithm starts at box 258 and assesses collision threats from traffic coming in the opposite direction from the host vehicle 80 at box 260. Once those threats are assessed, the algorithm determines whether it is safe for the vehicle 80 to enter the no-waiting region 94 or 106 at decision diamond 262, and if so, assesses any threats from traffic coming from the right travel lanes at box 264. The algorithm then determines based on that assessment whether the host vehicle 80 can safely enter the no-waiting region 94 or 106 at decision diamond 266, and if so, the algorithm determines whether pedestrians are present in the cross-walk at box 268. Based on the assessment of pedestrians, the algorithm determines whether it is safe to enter the intersection 42 at decision diamond 270, and if so, continues through the no-waiting region 94 or 106 and exits the intersection 42 at box 272, and the algorithm ends box 274. If the algorithm determines that it is not safe for the vehicle 80 to proceed at any of the decision diamonds 262, 266 and 270, then the algorithm issues a driver warning and/or automatically applies the brakes based on the discussion herein at box 276.

The collision threat assessment for a host vehicle turning left or right at an intersection as discussed above could be the subject of a number of situations that would cause the collision assessment algorithm to provide a warning or automatic braking to occur when no threat is present and not cause a warning to be issued or brakes applied if a threat is present, referred to herein as positive false alarms and negative false alarms, respectively. Positive false alarms and negative false alarms could occur when accurate data, such as digital maps and/or driver data, such as turn signals, brake position, etc, are not available. The following discussion provides six challenging driving use case scenarios where positive or negative false alarms are more likely to occur and some solutions to those challenges that could improve the collision threat assessment discussion above. The reduction of positive and negative false alarms can be performed as discussed herein using available visual data from cameras, radar sensors, lidar sensors, V2X inputs, path history, map data, driver inputs, such as turn signal status, head pose, eyes, etc.

Figure 16:
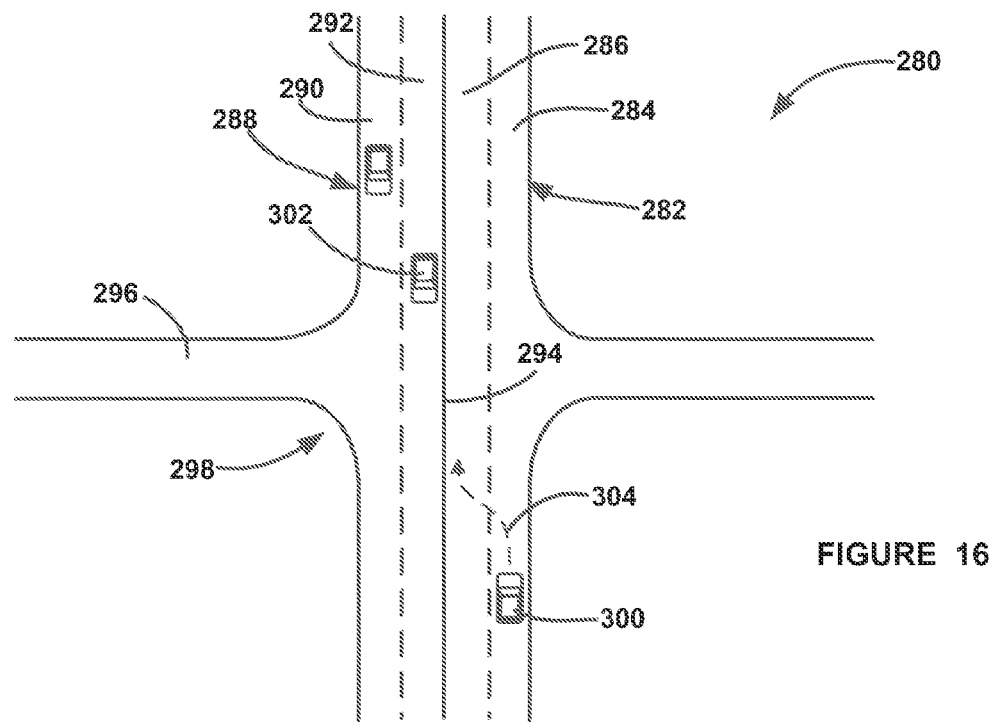
FIG. 16 is an illustration of an intersection showing a host vehicle traveling in an outside travel lane of a dual-lane roadway and making a lane change.
Figure 17:
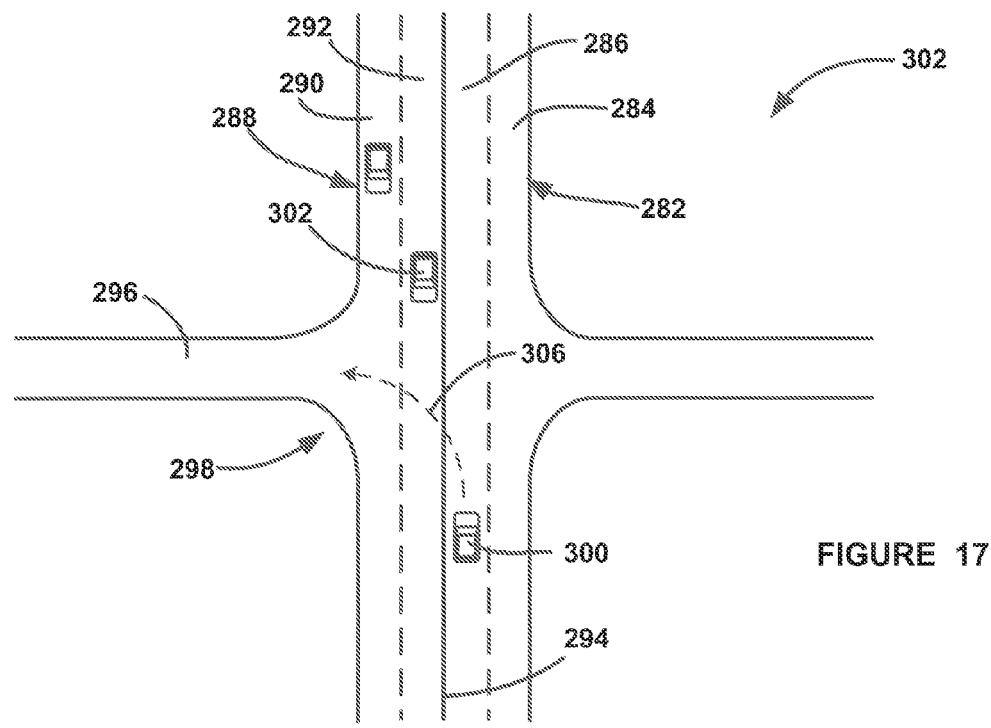
FIG. 17 is an illustration of an intersection showing a host vehicle traveling in an inside lane of a dual-lane roadway and making a left turn.

The first use case scenario is a false positive and includes making a lane change near an intersection versus turning left at the intersection, and is illustrated in FIGS. 16 and 17, where a driver may use turn signals to indicate both driving maneuvers. FIG. 16 is an illustration 280 and FIG. 17 is an illustration 302 of a roadway 282 having an outer travel lane 284 and an inner travel lane 286 and a roadway 288 for opposite direction traffic having an outer travel lane 290 and an inner travel lane 292, where the roadways 282 and 288 are separated by a center line 294. A crossing roadway 296 crosses the roadways 282 and 288 creating an intersection 298. A host vehicle 300 is shown traveling along the outer travel lane 284 in FIG. 16 and is making a lane change maneuver to the travel lane 286 along path 304. In FIG. 17, the host vehicle 300 is traveling in the inner travel lane 286 and is making a left turn along path 306 into the crossing roadway 296 in front of other direction vehicles 302 traveling in the travel lanes 290 and 292, as shown.

For both of these maneuvers, the trajectory of the host vehicle 300 during the initial movement to make the lane change or the left turn are similar, thus making it difficult to distinguish the maneuver especially when lane-level maps and/or high accuracy GPS data is not available. Typically, commercial navigation maps do not include lane level maps showing the number of lanes in a particular roadway. According to the invention, the collision assessment algorithms discussed herein will use whatever data is available to determine whether the host vehicle 300 is traveling in the travel lane 284 or the travel lane 286, where once that determination is made, then the algorithm will know better whether the host vehicle 300 is changing lanes from the travel lane 284 to the travel lane 286 or turning from the travel lane 286 to the crossing roadway 296. If the navigation maps include the number of lanes, then that information can be used to determine what lane the host vehicle 300 is in, and whether it is making a lane change or left turn. If the navigation maps do not include the separate travel lanes, then the algorithm can use other available data, such as the position and travel direction of other vehicles 304 in both the opposite direction or the same direction and location of objects, such as curbs, to determine what lane the host vehicle 300 is in. For example, if there are no same direction vehicles on the left of the host vehicle and there are other direction vehicles on the immediate left of the host vehicle, then the host vehicle 80 is in the left-most travel lane, here the travel lane 286.

In another situation that could provide false positives, a vehicle traveling in a dual-lane roadway may be changing lanes or may be turning into a driveway with or without a left turn lane. This is a difficult scenario to distinguish because most digital maps do not have driveways in the database. Further, some roadways have left turn lanes, helping provide an indication that the vehicle is making a left turn if it enters the left turn lane.

Figure 18:
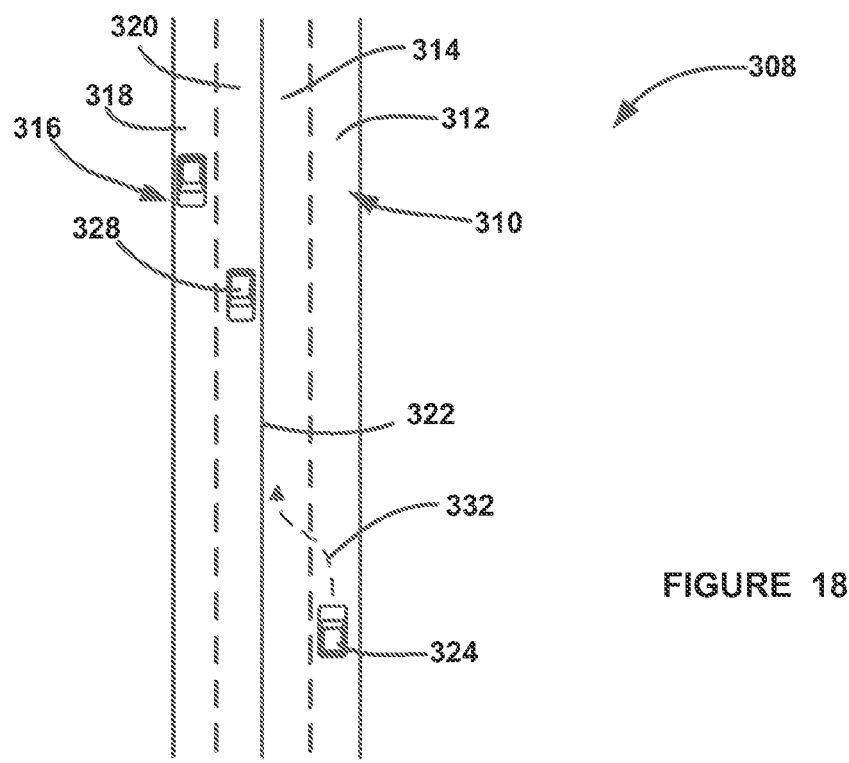
FIG. 18 is an illustration of a host vehicle traveling in outside lane of a dual-lane roadway making a lane change.
Figure 19:
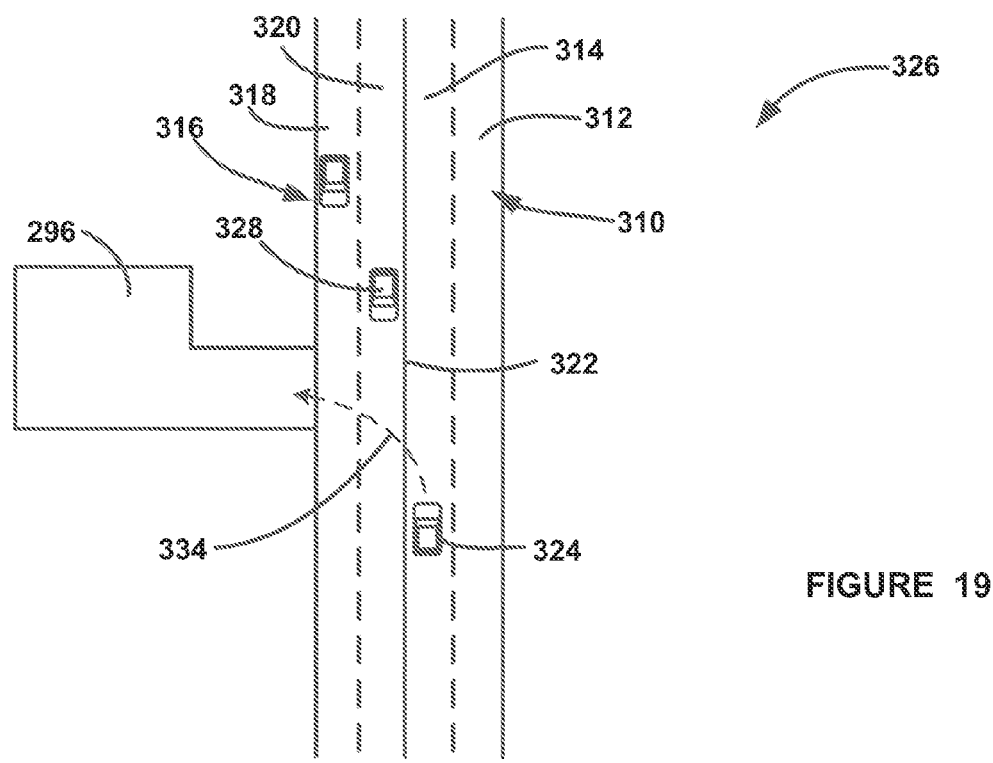
FIG. 19 is an illustration of a host vehicle traveling in an inside lane of a dual-lane roadway and turning into a driveway.

This situation is illustrated in FIGS. 18 and 19, where FIG. 18 is an illustration 308 and FIG. 19 is an illustration 330 showing a dual-lane roadway 310 for travel in one direction including an outside travel lane 312 and an inside travel lane 314 and a dual-lane roadway 316 for travel in an opposite direction including an outside travel lane 318 and an inside travel lane 320, where the roadways 310 and 316 are separated by center line 322. In FIG. 18, a host vehicle 324 is traveling in the outside travel lane 312 and is making a lane change into the inside travel lane 314 along path 332. In FIG. 19, the host vehicle 324 is traveling in the inside travel lane 314 and is making a left turn along path 334 into a driveway 326 in front of opposing vehicles 328 traveling in the roadway 316, as shown.

In order to reduce the false positives for this situation, the algorithm can use images from a forward vision camera to identify the color and type of lane marking, such as dash lines, solid white lines, solid yellow lines etc., the position of external objects, vehicles traveling in the same direction or a different direction, etc., to identify what maneuver the host vehicle 324 is performing. For example, left turn lanes are often designated by solid yellow lines, which when identified by the camera, can provide an indication to the algorithm that the host vehicle 324 is turning into a left turn lane to make a left turn.

In another situation that sometimes could provide a false positive for a vehicle turning at an intersection is a situation where the host vehicle is turning into a driveway located near the intersection. As discussed above, the predicted path of the host vehicle when turning at an intersection may be corrected based on the intersection geometry when the predicted path indicates that the host vehicle may travel outside of the intersection. If the algorithm makes a correction to a predicted path of the host vehicle when the actual path of the host vehicle is turning into the driveway instead of at the intersection, then the algorithm could issue false warnings based on its interpretation that the host vehicle is actually turning at the intersection.

Figure 20:
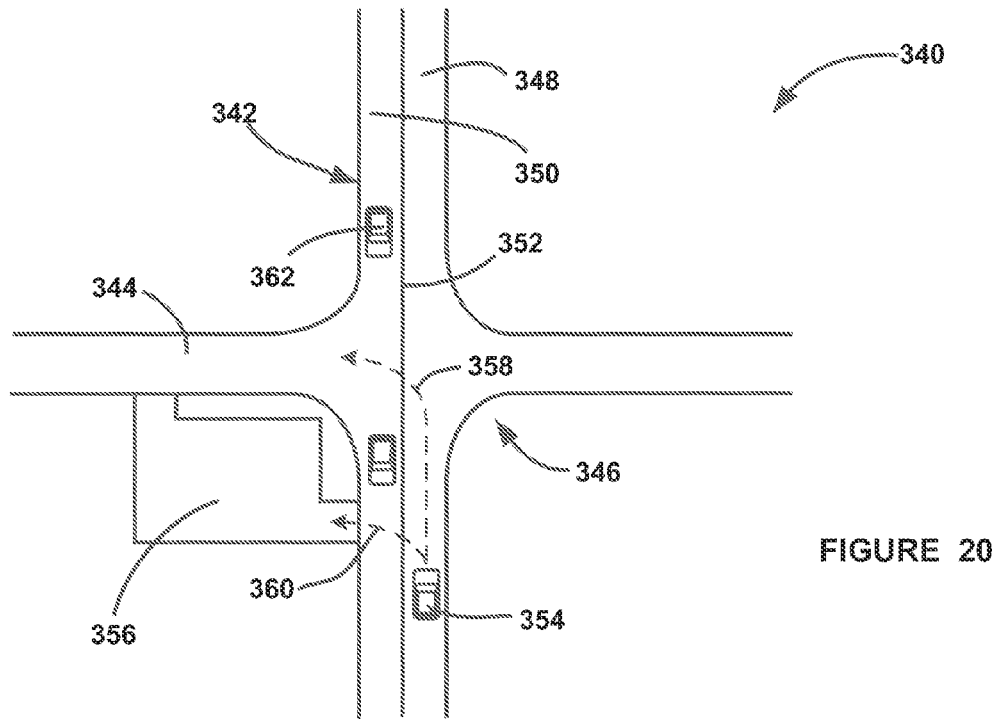
FIG. 20 is an illustration of a host vehicle traveling along a roadway and turning into a driveway just before an intersection.

FIG. 20 depicts this situation and is an illustration 340 showing perpendicular roadways 342 and 344 defining an intersection 346, where the roadway 344 includes opposing traffic lanes 348 and 350 separated by center line 352. A host vehicle 354 is traveling in the lane 348 where the collision assessment algorithm determines that it is intending to make a left turn, either by turn signal activation or otherwise. In some situations, the algorithm may determine that the host vehicle 354 is going to turn left into the roadway 344 as indicated by predicted path 358 when in fact the vehicle 354 is turning into a driveway 356, such as at a gas station, as indicated by actual path 360. Thus, the position and speed of different opposite direction vehicles 362 determine the level of threat for the host vehicle 354.

In one known collision assessment algorithm design, the left turning features of the algorithm are activated within some detected parameter distance D, such as 100 meters, before the intersection 346 based on a map database and turn signal activity, for example, and that is why the algorithm may predict the path of the vehicle 354 to be on the path 358 before the intersection 346. In order to reduce or prevent this false negative, the present invention proposes causing the algorithm to obtain the size of the intersection 346, such as the number of lanes in all directions through the intersection 346, from navigation maps, or otherwise, and dynamically adjust the distance parameter D for the particular intersection. Therefore, for smaller intersections, the parameter D can be reduced so that the algorithm does not predict the path of the vehicle 354 as turning left until it is closer to the intersection 346, and as such may be past the driveway 356 when the predicted path feature is initiated. For larger intersections, the parameter D can be maintained or increased to be relatively high because of the distance across the intersection 346 where the vehicle 354 would still likely be past the driveway 356.

Figure 21:
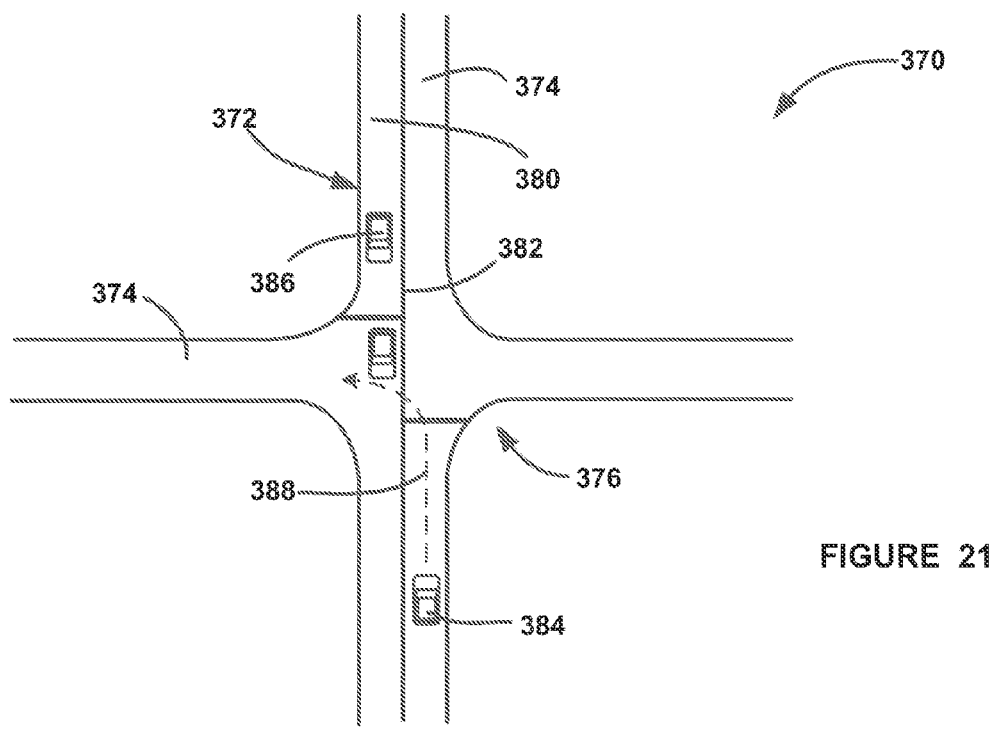
FIG. 21 is an illustration of a vehicle making a left turn at an intersection.

The last three false positive scenarios discussed herein include a failure to detect stop sign/signal lights by front vision cameras on the host vehicle (false positive), obstruction of a sensor field-of-view on the host vehicle by other vehicles, trucks, high mediums, lamp posts, etc. (false negative), and no intersection data being available from navigation maps (false negative). These three situations will be discussed with reference to FIG. 21, which is an illustration 370 showing perpendicular roadways 372 and 374 defining an intersection 376, where the roadway 372 includes opposing traffic lanes 378 and 380 separated by a center line 382. A host vehicle 384 is traveling in the lane 378 and opposing vehicles 386 are traveling in the lane 380, where the host vehicle 384 is turning left into the roadway 374.

Slowing down at an intersection that does not have a stop sign or a signal for the traffic in one of the directions is an indication without other vehicles in front of the host vehicle 384 that the host vehicle 384 intends to make a left turn. The host vehicle 384 may also slow down at the intersection 376 when there is a stop sign or a signal even when the host vehicle 384 is going straight through the intersection 376. Not knowing the intent of the host vehicle 384 becomes even more problematic if there is only a single lane for all of straight through, left-turning and right-turning vehicles. If the algorithm is not able to identify the phase of a traffic signal or a stop sign properly using sensory data, such as a forward vision camera, radar sensors, lidar sensors, V2X communications, etc., a false positive information state can occur. Further, the vehicle driver may not turn on the turn signal showing the intent to turn left. Therefore, the false positive may occur if the algorithm does not detect the stop sign or signal and the vehicle 384 is slowing down at the intersection 376. In this situation, the algorithm may be limited to an inform only situation without providing warning or automatic braking in the absence of additional supporting inputs, such as a left turn signal, a change in road wheel angle, etc. Pedestrian crossings or road markings may also be used as additional inputs if they are available. If the intersection 376 is determined to be a stop intersection, where vehicles in the approach region need to stop, the system may delay providing the information until additional inputs, such as turn signal activation or wheel angle, are available.

At an intersection, the field-of-view (FOV) of sensors on the host vehicle 384 by other vehicles, trucks, high medians, lamp posts, etc., may cause the sensor to not identify lane markings, and as such, cause false negatives to be issued. In this situation, the present invention proposes identifying when such sensor blockages are occurring and inform the driver that the turning assist is in inform mode only. Alternately, V2X information can be used if available.

Sometimes map databases do not have intersection data available, which could lead to false negatives. In this situation, if the host vehicle 384 is slowing down close to an intersection center and no intersection is indicated on the map, and without traffic in front of the vehicle 384, an indication for a left turn can be provided. The relative motion to other surrounding vehicles can also be used as data. In this situation, based on the vehicle wheel angle, a predicted path is determined that may not be accurate to the intersection 376 since it is not shown on the map. The algorithm can use yaw rate and past history to calculate a predicted path when a change in the wheel angle is detected. The turning assist features will use this default predicted path when the wheel angle is less than some delta value and use the path history and yaw rate to calculate the predicted path when the wheel angle is greater than the delta value to warn the driver.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for collision threat assessment when a host vehicle is turning left or right at an intersection, said method comprising:
   determining if the host vehicle is likely to turn left or right at the intersection with a predetermined level of confidence;
   segmenting the intersection and surrounding area into a plurality of different regions where each region has a different level of collision threat risk if the host vehicle is likely to turn left or right at the intersection;
   obtaining speed, velocity and position data of the host vehicle using sensors on the host vehicle;

obtaining speed, velocity and position data of one or more remote vehicles and/or other objects in or near the intersection, including using information and data from one or more of a map database, a long range radar sensor on the vehicle, a short range radar sensor on the vehicle, cameras on the vehicle, a lidar sensor on the vehicle, V2X communications, Internet communications and satellite communications;

determining, by a controller including a processor, a predicted path of the host vehicle based on the speed, velocity and position data as the host vehicle travels through the intersection for each of the different segmented regions;

determining, by the controller, a predicted path of one or more of the remote vehicles based on the speed, velocity and position data as the one or more vehicles travel through the intersection;

determining, by the controller, whether the host vehicle and the one or more remote vehicles will simultaneously occupy a collision zone in the intersection based on the predicted path of the host vehicle and the predicted path of the one or more remote vehicles;

issuing, by the controller, a warning to a driver of the host vehicle if the host vehicle and the one or more remote vehicles will occupy the collision zone during the same time, including determining a time at current vehicle speed and predicted path of when the host vehicle will enter the collision zone, and issuing the warning if the time to the collision zone is below a first predetermined threshold; and providing automatic braking of the host vehicle, by the controller, if the time to the collision zone is less than a second predetermined threshold that is shorter than the first predetermined threshold.

2. The method according to claim 1 wherein segmenting the intersection into different regions includes identifying an approach region before the intersection that the host vehicle will travel through, identifying a waiting region in the intersection that the host vehicle will travel through when making the turn, and identifying a no-waiting region in the intersection that the host vehicle will travel through when making the turn.

3. The method according to claim 1 wherein determining the predicted path of the host vehicle also includes considering geometry of the intersection that is used to refine the predicted path.

4. The method according to claim 1 wherein determining whether the host vehicle and the one or more remote vehicles will simultaneously occupy a collision zone in the intersection includes determining a duration that the host vehicle will occupy the collision zone based on the speed and the predicted path of the host vehicle, determining a duration that the one or more remote vehicles will occupy the collision zone based on the speed and predicted path of the one or more remote vehicles, and determining if the durations overlap.

5. The method according to claim 1 wherein determining whether the host vehicle and the one or more remote vehicles will simultaneously occupy a collision zone in the intersection includes determining whether the host vehicle and the one or more remote vehicles will simultaneously occupy the collision zone before the host vehicle enters the intersection.

6. The method according to claim 1 wherein determining whether the host vehicle and the one or more remote vehicles will simultaneously occupy a collision zone in the intersection includes determining whether the host vehicle and the one or more remote vehicles will simultaneously occupy the collision zone when the host vehicle is in the intersection when the one or more remote vehicles is a opposite direction traveling remote vehicle.

7. The method according to claim 1 further comprising determining that the host vehicle will not stop in the intersection when making the turn.

8. The method according to claim 1 wherein the first threshold is determined experimentally considering driver reaction time and system delays.

9. The method according to claim 1 wherein the second threshold for providing automatic braking is determined based on system delays.

10. The method according to claim 1 further comprising providing information of a potential collision to the host vehicle if the time to the collision zone is greater than the first predetermined threshold, but less than a third predetermined threshold.

11. The method according to claim 1 further comprising determining that the host vehicle is coming to or has come to a stop in the intersection in anticipation of making a turn after opposing traffic has cleared, wherein issuing a warning includes determining a likely path the host vehicle will make when making the turn, calculating a closeness coefficient between the likely path of the host vehicle and the predicted path of the host vehicle, and issuing the warning if the closeness coefficient is greater than a predetermined closeness threshold, a time that the one or more remote vehicles will enter the collision zone is less than a predetermined time threshold and brakes of the host vehicle have been released.

12. The method according to claim 11 wherein determining the closeness coefficient between the predicted path and the likely path includes using the equation:

$$C_{PL} = C_X * C_Y,$$

where:

$$C_X = \frac{N * \Sigma X_{Pi} * X_{Li} - \Sigma X_{Pi} * \Sigma X_{Li}}{\sqrt{N * \Sigma (X_{Pi})^2 - (\Sigma X_{Pi})^2} * \sqrt{N * \Sigma (X_{Li})^2 - (\Sigma X_{Li})^2}},$$

$$C_Y = \frac{N * \Sigma Y_{Pi} * Y_{Li} - \Sigma Y_{Pi} * \Sigma Y}{\sqrt{N * \Sigma (Y_{Pi})^2 - (\Sigma Y_{Pi})^2} * \sqrt{N * \Sigma (Y_{Li})^2 - (\Sigma Y_{Li})^2}},$$

and where $C_{PL}$, is the closeness coefficient, $C_X$ and $C_y$ represent a correlation between the predicted path and the likely path in the X and Y directions, and are calculated using the closeness between individual nodes N, where $(X_{Pi}, Y_{Pi})$ and $(X_{Li}, Y_{Li})$ correspond to $(X,Y)$ coordinates of the nodes N on the predicted path and the likely path, respectively.

13. The method according to claim 1 wherein determining a predicted path of the host vehicle includes determining the predicted path of the host vehicle based on a yaw rate and/or road wheel angle of the host vehicle.

14. The method according to claim 1 wherein determining if the host vehicle is likely to turn left or right at the intersection includes using information and data from one or more of turn signal activity, a map database, a long range radar sensor on the vehicle, a short range radar sensor on the vehicle, cameras on the vehicle, a lidar sensor on the vehicle, V2X communications, Internet communications and satellite communications.

15. The method according to claim 1 wherein segmenting the intersection and surrounding area into regions includes segmenting the intersection surrounding regions based on intersection geometry and vehicle state.

16. The method according to claim 1 further comprising determining whether the host vehicle should enter the intersection including determining whether a traffic signal is red and a distance to an intersection stop bar.

17. A method for collision threat assessment when a host vehicle is turning left or right at an intersection, said method comprising:
  determining if the host vehicle is likely to turn left or right at the intersection with a predetermined level of confidence;
  segmenting the intersection and surrounding area into a plurality of different regions where each region has a different level of collision threat risk if the host vehicle is likely to turn left or right at the intersection;
  obtaining speed, velocity and position data of the host vehicle using sensors on the host vehicle;
  obtaining speed, velocity and position data of one or more remote vehicles and/or other objects in or near the intersection, including using information and data from one or more of a map database, a long range radar sensor on the vehicle, a short range radar sensor on the vehicle, cameras on the vehicle, a lidar sensor on the vehicle, V2X communications, Internet communications and satellite communications;
  determining, by a controller including a processor, a predicted path of the host vehicle based on the speed, velocity and position data as the host vehicle travels through the intersection for each of the different segmented regions;
  determining, by the controller, a predicted path of one or more of the remote vehicles based on the speed, velocity and position data as the one or more vehicles travel through the intersection;
  determining, by the controller, a duration that the host vehicle will occupy a collision zone based on the speed and the predicted path of the host vehicle;
  determining, by the controller, a duration that the one or more remote vehicles will occupy the collision zone based on the speed and predicted path of the one or more remote vehicles;
  determining, by the controller, if the durations overlap;
  determining, by the controller, that the host vehicle will not stop in the intersection when making the turn;
  issuing, by the controller, a warning to a driver of the host vehicle if the durations overlap and if a time to enter the collision zone by the host vehicle at a current speed and predicted path of the host vehicle is less than a first predetermined threshold;
  providing automatic braking of the host vehicle, by the controller, if the time to the collision zone is less than a second predetermined threshold that is shorter than the first predetermined threshold; and
  providing, by the controller, information of a potential collision to the host vehicle if the time to the collision zone is greater than the first predetermined threshold, but less than a third predetermined threshold.

18. The method according to claim 17 wherein segmenting the intersection into different regions includes identifying an approach region before the intersection that the host vehicle will travel through, identifying a waiting region in the intersection that the host vehicle will travel through when making the turn, and identifying a no-waiting region in the intersection that the host vehicle will travel through when making the turn.

19. The method according to claim 17 wherein determining the predicted path of the host vehicle also includes considering geometry of the intersection that is used to refine the predicted path.

20. The method according to claim 17 wherein the first threshold is determined experimentally considering driver reaction time and system delays and the second threshold is determined based on system delays.

21. The method according to claim 17 wherein segmenting the intersection and surrounding area into regions includes segmenting the intersection surrounding regions based on intersection geometry and vehicle state.

22. A method for collision threat assessment when a host vehicle is turning left or right at an intersection, said method comprising:
  determining if the host vehicle is likely to turn left or right at the intersection with a predetermined level of confidence;
  segmenting the intersection and surrounding area into a plurality of different regions where each region has a different level of collision threat risk if the host vehicle is likely to turn left or right at the intersection;
  obtaining speed, velocity and position data of the host vehicle using sensors on the host vehicle;
  obtaining speed, velocity and position data of one or more remote vehicles and/or other objects in or near the intersection, including using information and data from one or more of a map database, a long range radar sensor on the vehicle, a short range radar sensor on the vehicle, cameras on the vehicle, a lidar sensor on the vehicle, V2X communications, Internet communications and satellite communications;
  determining, by a controller including a processor, a predicted path of the host vehicle based on the speed, velocity and position data as the host vehicle travels through the intersection for each of the different segmented regions;
  determining, by the controller, a predicted path of one or more of the remote vehicles based on the speed, velocity and position data as the one or more vehicles travel through the intersection;
  determining, by the controller, a duration that the host vehicle will occupy a collision zone based on the speed and the predicted path of the host vehicle;
  determining, by the controller, a duration that the one or more remote vehicles will occupy the collision zone based on the speed and predicted path of the one or more remote vehicles;
  determining, by the controller, if the durations overlap;
  determining, by the controller, that the host vehicle is coming to or has come to a stop in the intersection in anticipation of making a turn after opposing traffic has cleared;
  determining, by the controller, a likely path the host vehicle will take when making the turn;
  calculating, by the controller, a closeness coefficient between the likely path of the host vehicle and the predicted path of the host vehicle;
  issuing, by the controller, a warning if the closeness coefficient is greater than the predetermined closeness threshold, the time that the one or more remote vehicles will enter the collision zone is less than a predetermined time threshold, and brakes of the host vehicle have been released;
  providing automatic braking of the host vehicle, by the controller, if the time to the collision zone is less than a second predetermined threshold that is shorter than the first predetermined threshold; and providing, by the controller, information of a potential collision to the host vehicle if the time to the collision zone is greater than the first predetermined threshold, but less than a third predetermined threshold.

23. The method according to claim 22 wherein determining the closeness coefficient between the predicted path and the likely path includes using the equation:

$$C_{PL} = C_X * C_Y,$$

where:

$$C_X = \frac{N * \Sigma X_{Pi} * X_{Li} - \Sigma X_{Pi} * \Sigma X_{Li}}{\sqrt{N * \Sigma (X_{Pi})^2 - (\Sigma X_{Pi})^2} * \sqrt{N * \Sigma (X_{Li})^2 - (\Sigma X_{Li})^2}},$$

$$C_Y = \frac{N * \Sigma Y_{Pi} * Y_{Li} - \Sigma Y_{Pi} * \Sigma Y}{\sqrt{N * \Sigma (Y_{Pi})^2 - (\Sigma Y_{Pi})^2} * \sqrt{N * \Sigma (Y_{Li})^2 - (\Sigma Y_{Li})^2}},$$

and where $C_{PL}$ is the closeness coefficient, $C_X$ and $C_y$ represent a correlation between the predicted path and the likely path in the X and Y directions, and are calculated using the closeness between individual nodes N, where $(X_{Pi}, Y_{Pi})$ and $(X_{Li}, Y_{Li})$ correspond to (X,Y) coordinates of the nodes N on the predicted path and the likely path, respectively.

24. The method according to claim 22 wherein segmenting the intersection into different regions includes identifying an approach region before the intersection that the host vehicle will travel through, identifying a waiting region in the intersection that the host vehicle will travel through when making the turn, and identifying a no-waiting region in the intersection that the host vehicle will travel through when making the turn.

25. The method according to claim 22 wherein determining the predicted path of the host vehicle also includes considering geometry of the intersection that is used to refine the predicted path.

26. The method according to claim 22 wherein the first threshold is determined experimentally considering driver reaction time and system delays and the second threshold is determined based on system delays.

27. The method according to claim 22 wherein segmenting the intersection and surrounding area into regions includes segmenting the intersection surrounding regions based on intersection geometry and vehicle state.

* * * * *